(12) United States Patent
Kubota et al.

(10) Patent No.: US 10,656,388 B2
(45) Date of Patent: May 19, 2020

(54) IMAGING LENS

(71) Applicant: KANTATSU CO., LTD., Tochigi (JP)

(72) Inventors: Yoji Kubota, Nagano (JP); Kenichi Kubota, Tochigi (JP); Hitoshi Hirano, Tochigi (JP); Hisao Fukaya, Tochigi (JP)

(73) Assignee: KANTATSU CO., LTD., Tokyo (JP)

( * ) Notice: Subject to any disclaimer, the term of this patent is extended or adjusted under 35 U.S.C. 154(b) by 0 days.

(21) Appl. No.: 16/188,427

(22) Filed: Nov. 13, 2018

(65) Prior Publication Data

US 2019/0079274 A1    Mar. 14, 2019

Related U.S. Application Data

(63) Continuation of application No. 15/685,799, filed on Aug. 24, 2017, now Pat. No. 10,345,557, which is a continuation of application No. 15/235,280, filed on Aug. 12, 2016, now Pat. No. 9,772,475.

(30) Foreign Application Priority Data

Aug. 31, 2015 (JP) ................................ 2015-171027

(51) Int. Cl.
*G02B 9/64* (2006.01)
*G02B 13/18* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .... G02B 13/0045; G02B 13/005; G02B 9/64; G02B 13/04

USPC ................................ 359/708, 717, 751, 755
See application file for complete search history.

(56) References Cited

U.S. PATENT DOCUMENTS

| | | | |
|---|---|---|---|
| 10,025,064 B2 | 7/2018 | Nakanuma | |
| 2010/0195221 A1 | 8/2010 | Sato | |
| 2012/0229692 A1 | 9/2012 | Matsumura | |
| 2012/0229693 A1 | 9/2012 | Matsumura | |
| 2013/0050846 A1 | 2/2013 | Huang | |
| 2015/0009578 A1 | 1/2015 | Shinohara et al. | |
| 2015/0103414 A1 | 4/2015 | Baik | |
| 2015/0198787 A1* | 7/2015 | Kubota ............. | G02B 13/0045 359/708 |

(Continued)

FOREIGN PATENT DOCUMENTS

JP    2012-155223 A    8/2012

*Primary Examiner* — William Choi
(74) *Attorney, Agent, or Firm* — Kubotera & Associates, LLC

(57) ABSTRACT

An imaging lens includes a first lens group and a second lens group, arranged from an object side to an image plane side. The first lens group includes a first lens, a second lens, and a third lens. The second lens group includes a front side lens group and a rear side lens group. The front side lens group includes a fourth lens and a fifth lens. The rear side lens group includes a sixth lens and a seventh lens both having two aspheric surfaces. The imaging lens has a total of seven single lenses. The first to seventh lenses are arranged respectively with a space in between. The third lens has convex surfaces on both sides. The fourth lens has a concave surface on the object side. The fifth lens has a concave surface on the image plane side. The rear side lens group has a specific focal length.

20 Claims, 15 Drawing Sheets

(56) References Cited

U.S. PATENT DOCUMENTS

2016/0085054 A1  3/2016  Asami

* cited by examiner

IMAGING LENS

CROSS-REFERENCE TO RELATED APPLICATIONS

This is a continuation application of a prior application Ser. No. 15/685,799, filed on Aug. 24, 2017, allowed, which is a continuation application of a prior application Ser. No. 15/235,280, filed on Aug. 12, 2016 and issued as U.S. Pat. No. 9,772,475 on Sep. 26, 2017, which claims priority of Japanese Patent Application No. 2015-171027, filed on Aug. 31, 2015.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to perform functions such as those of digital still cameras and car navigation systems on the smartphones. In order to perform those various functions, most models of smartphones include cameras.

Generally speaking, product groups of such smartphones are often composed according to specifications for beginners to advanced users. Among them, an imaging lens to be mounted in a product designed for the advanced users is required to have a high-resolution lens configuration so as to be also applicable to a high pixel count imaging element of these years, as well as a small size.

As a method of attaining the high-resolution imaging lens, there has been a method of increasing the number of lenses that compose the imaging lens. However, the increase of the number of lenses easily causes an increase in the size of the imaging lens. Accordingly, in development of the imaging lens, it has been necessary to achieve high resolution while shortening a total track length (TTL) by restraining the increase of the number of lenses or by other method.

In these days, with significant advancement in achieving the higher pixel count of an imaging element and image processing technology, an imaging lens has been developed so as to attain higher resolution rather than a shorter total track length of the imaging lens. For example, there is a camera unit, which is configured separately from a smartphone, and is composed of a high-resolution imaging lens, an imaging element, etc. By attaching the camera unit onto a smartphone, it is achievable to obtain images having equivalent quality to those of high-end model digital still cameras. However, because of the presence of the camera unit, portability of the smartphone is ruined. Therefore, a smartphone with a built-in camera is superior to such smartphone with an attached camera unit in its convenience and portability. Accordingly, there remains a demand for a small-sized high resolution imaging lens.

In case of a lens configuration composed of seven lenses, due to the large number of lenses of the imaging lens, it has high flexibility in design. In addition, it is achievable to attain satisfactory correction of aberrations, which are necessary for high-resolution imaging lenses, and downsizing of the imaging lens in a balanced manner. For example, as the conventional imaging lens having the seven-lens configuration, an imaging lens described in Patent Reference has been known.

Patent Reference: Japanese Patent Application Publication No. 2012-155223

The conventional imaging lens described in Patent Reference includes a first lens that has a shape of a biconvex shape, a second lens that has a shape of a biconcave shape joined to the first lens, a third lens that is negative and has a shape of a meniscus lens directing a convex surface thereof to the object side, a fourth lens that is positive and has a shape of a meniscus lens directing a concave surface thereof to the object side, a fifth lens that is negative and directs a convex surface thereof to the object side, a sixth lens that has a biconvex shape, and a seventh lens that has a biconcave shape, arranged in the order from the object side. According to the conventional imaging lens of Patent Reference, the first through the fourth lenses compose a first lens group, and the fifth through the seventh lenses compose the second lens group. With the configuration, by restraining the ratio of a focal length of the first lens group to that of the second lens group within a certain range, it is achievable to downsize of the imaging lens and satisfactorily correct aberrations.

In case of the conventional imaging lens of Patent Reference, although the size of the imaging lens is small, correction of the image plane is insufficient and the distortion is especially large. Therefore, there is a limit by itself to achieve high performance imaging lens. With the lens configuration of the imaging lens of Patent Reference, it is difficult to achieve satisfactory aberration correction while downsizing of the imaging lens.

Here, such a problem is not specific to the imaging lens to be mounted in cellular phones and smartphones. Rather, it is a common problem for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain both downsizing thereof and satisfactory aberration correction.

Further objects and advantages of the present invention will be apparent from the following description of the invention.

SUMMARY OF THE INVENTION

In order to attain the objects described above, according to the present invention, an imaging lens includes a first lens group having positive refractive power; and a second lens group having negative refractive power, arranged in the order from an object side to an image plane side. The first lens group is composed of a first lens, a second lens, and a third lens. The second lens group is composed of a fourth lens, a fifth lens, a sixth lens, and a seventh lens. Here, the term "lens" used herein refers to an optical element that has refractive power. Therefore, the term "lens" used herein does not include a prism, which changes a traveling direction of a light beam, a flat filter, and the like. Those optical elements may be disposed in front of or behind the imaging lens, or between respective lenses, as necessary.

When the whole lens system has the focal length f and a distance along the optical axis from an object-side surface of the first lens to the image plane is La, the imaging lens of the invention preferably satisfies the following conditional expression (1):

$$1.2 < La/f < 1.8 \quad (1)$$

When the imaging lens satisfies the conditional expression (1), it is achievable to suitably downsize the imaging lens. In these years, there is an increasing demand for taking images of a wider range through an imaging lens. For this reason, there is increasing demand to attain both downsizing and a wider angle of view of the imaging lens. Especially in case of an imaging lens to be built in a thin portable device, e.g. smartphones, it is necessary to be able to accommodate an imaging lens in a limited space. Therefore, there is often a strict limitation in a length of the imaging lens in a direction of an optical axis.

According to a first aspect of the invention, when the imaging lens of the invention has a maximum image height Hmax, the imaging lens preferably satisfies the following conditional expression (2):

$$1.3 < La/Hmax < 1.8 \quad (2)$$

In case of the imaging lens of the invention, it is preferred to have air (gaps filled with air) between the respective lenses, the first lens through the seventh lens, arranged as described above. With those gaps between the lenses arranged as described above, the imaging lens of the invention will not include any cemented lens. In such a lens configuration, it is possible to form all the seven lenses that compose the imaging lens from a plastic material. Therefore, it is achievable to suitably restrain the manufacturing cost of the imaging lens.

In case of the imaging lens of the invention, each of the first through the seventh lenses is preferably formed to have an aspheric shape on both surfaces thereof. Forming both surfaces of each of the lenses as the aspheric shapes, it is achievable to more satisfactorily correct aberrations from proximity of the optical axis of the lens to the periphery thereof. Especially, aberrations at periphery of the lens will be satisfactorily corrected.

The first lens group preferably includes the first lens having positive refractive power, the second lens having negative refractive power, and the third lens.

The second lens group preferably includes a front side lens group having negative refractive power and a rear side lens group having positive refractive power. The front side lens group preferably includes the fourth lens and the fifth lens. The rear side lens group preferably includes the sixth lens and the seventh lens.

According to the imaging lens of the invention having the above-described configuration, the arrangement of the refractive power is "positive-negative-positive" for the first lens group, the front side lens group, and the rear side lens group. As a result, it is achievable to satisfactorily correct the aberrations.

According to a second aspect of the invention, when the whole lens system has a focal length f and a distance along the optical axis between the first lens group and the second lens group is Da, the imaging lens having the above-described configuration preferably satisfies the following conditional expression (3):

$$0.05 < Da/f < 0.3 \quad (3)$$

When the imaging lens satisfies the conditional expression (3), it is possible to correct a chromatic aberration, astigmatism, a field curvature, and a distortion in a balanced manner, while downsizing the imaging lens. When the value exceeds the upper limit of upper limit of 0.3, it is advantageous for downsizing of the imaging lens. However, it is difficult to secure a back focal length. Moreover, the axial chromatic aberration is insufficiently corrected (a focal position at a short wavelength moves to the object side relative to that at a reference wavelength).

In addition, the chromatic aberration of magnification is excessively corrected (an image-forming point at a short wavelength moves in a direction to be away from the optical axis relative to that at a reference wavelength). Moreover, in the astigmatism, the sagittal image surface tilts to the image plane side, so that the astigmatic difference increases. Moreover, in the image-forming surface curves towards the image plane side, and the field curvature is excessively corrected. In addition, the distortion increases in the positive direction. Therefore, it is difficult to obtain satisfactory image-forming performance.

On the other hand, when the value is below the lower limit of 0.05, it is easy to correct the chromatic aberration. However, in the astigmatism, the sagittal image surface tilts to the object side, and the astigmatic difference increases. In addition, an image-forming surface curves towards the object side and the field curvature is insufficiently corrected. Therefore, it is difficult to obtain satisfactory image-forming performance.

According to a third aspect of the invention, when the first lens has an Abbe's number vd1, the second lens has an Abbe's number vd2, and the third lens has an Abbe's number vd3, the imaging lens preferably satisfies the following conditional expressions (4) through (6):

$$35 < vd1 < 75 \quad (4)$$

$$15 < vd2 < 35 \quad (5)$$

$$35 < vd3 < 75 \quad (6)$$

When the imaging lens satisfies the conditional expressions (4) through (6), it is achievable to satisfactorily correct the chromatic aberration in the first lens group.

According to the imaging lens of the invention, the first lens is preferably formed in a shape so as to direct a convex surface thereof to the object side, and the seventh lens is preferably formed in a shape so as to have a positive curvature radius on an image plane-side surface thereof, i.e., so as to be formed in a shape directing a concave surface thereof to the image plane side near the optical axis.

According to the imaging lens of the invention, it is preferred that the first lens has positive refractive power, the second lens has negative refractive power, the third lens has positive refractive power, and the fourth lens has negative refractive power.

With such refractive power of the first lens to the fourth lens, the arrangement of the refractive power is "positive-negative-positive-negative" from the first lens to the fourth lens from the object side. Such the lens configuration, in which positive refractive power and negative refractive power are alternately arranged, is very effective configuration to restrain the Petzval sum. With the lens configuration described above, it is achievable to satisfactorily correct the astigmatism and the field curvature.

According to the imaging lens of the invention, the fourth lens is preferably formed in a shape so as to have a negative curvature radius on the object-side surface thereof. Here, such a shape to have the negative curvature radius on the object-side surface thereof, there are two types of shapes, i.e., a shape of a meniscus lens directing a concave surface thereof to the object side near the optical axis and a shape of a biconcave lens near the optical axis.

According to a fourth aspect of the invention, when the whole lens system has the focal length f and a curvature radius of the object-side surface of the fourth lens is R4f, the imaging lens of the invention preferably satisfies the following conditional expression (7):

$$-0.6<R4f/f<-0.1 \quad (7)$$

According to a fifth aspect of the invention, when the whole lens system has the focal length f and a curvature radius of the image plane-side surface of the fourth lens is R4r, the imaging lens of the invention preferably satisfies the following conditional expression (8):

$$-1.2<R4r/f<-0.3 \quad (8)$$

According to the imaging lens of the invention, the fourth lens is preferably formed in a shape so that curvature radii of an object-side surface and an image plane-side surface are both negative, i.e., so as to be formed in a shape of a meniscus lens directing a concave surface thereof to the object side near the optical axis.

When the fourth lens is formed in a shape of a meniscus lens directing a concave surface thereof to the object side near the optical axis as described above, the imaging lens of the invention preferably further satisfies the above conditional expressions (7) and (8).

According to a sixth aspect of the invention, when the whole lens system has the focal length f and a curvature radius of the image plane-side surface of the seventh lens is R7r, the imaging lens of the invention preferably satisfies the following conditional expression (9):

$$0.2<R7r/f<0.6 \quad (9)$$

According to the invention, it is preferred that the sixth lens has positive refractive power and the seventh lens has negative refractive power.

In addition, according to the invention, the sixth lens and the seventh lens are preferably formed as aspheric surfaces having an inflexion point on at least one of surfaces of each of those lenses.

According to a seventh aspect of the invention, when the fourth lens has an Abbe's number vd4, the imaging lens having the above-described configuration preferably satisfies the following conditional expression (10):

$$15<vd4<35 \quad (10)$$

When the imaging lens satisfies the conditional expression (10), it is achievable to more satisfactorily correct the chromatic aberration.

According to an eighth aspect of the invention, when the whole lens system has the focal length f and the first lens group has a focal length F1, the imaging lens having the above-described configuration preferably satisfies the following conditional expression (11):

$$0.6<F1/f<1.3 \quad (11)$$

When the imaging lens satisfies the conditional expression (11), it is achievable to satisfactorily restrain the chromatic aberration and the astigmatism within satisfactory ranges, while downsizing the imaging lens. When the value exceeds the upper limit of 1.3, the axial chromatic aberration is excessively corrected (a focal position at a short wavelength moves to the image plane side relative to that at a reference wavelength).

In addition, the chromatic aberration of magnification is insufficiently corrected (an image-forming point at a short wavelength moves in a direction to be close to the optical axis relative to that at a reference wavelength). In the astigmatism, the sagittal image surface tilts to the image plane side and the astigmatic difference increases. The field curvature is excessively corrected. For this reason, it is difficult to obtain satisfactory image-forming performance. On the other hand, when the value is below the lower limit of 0.6, it is advantageous for downsizing the imaging lens. However, the axial chromatic aberration is insufficiently corrected and the chromatic aberration of magnification is excessively corrected. Moreover, in the astigmatism, the sagittal image surface tilts to the object side, and the astigmatic difference increases. Therefore, it is difficult to obtain satisfactory image-forming performance.

According to a ninth aspect of the invention, when the first lens group has the focal length F1 and the second lens has a focal length f2, the imaging lens having the above-described configuration preferably satisfies the following conditional expression (12):

$$-8<f2/F1<-1.5 \quad (12)$$

When the imaging lens satisfies the conditional expression (12), it is achievable to satisfactorily correct the chromatic aberration, the astigmatism, and a coma aberration, while downsizing the imaging lens. When the value exceeds the upper limit of −1.5, the axial chromatic aberration is excessively corrected and the chromatic aberration of magnification is insufficiently corrected. In addition, an inner coma aberration increases for off-axis light fluxes. Moreover, in the astigmatism, the sagittal image surface tilts to the image plane side, and the astigmatic difference increases. The field curvature is excessively corrected. Therefore, it is difficult to obtain satisfactory image-forming performance.

On the other hand, when the value is below the lower limit of −8, it is advantageous for downsizing of the imaging lens. However, the axial chromatic aberration is insufficiently corrected and the astigmatic difference increases. In addition, an outer coma aberration increases for off-axis light fluxes, so that it is difficult to obtain satisfactory image-forming performance.

According to a tenth aspect of the invention, when the front side lens group has a focal length Ff and the rear side lens group has a focal length Fr, the imaging lens having the above-described configuration preferably satisfies the following conditional expression (13):

$$-1.5<Ff/Fr<-0.1 \quad (13)$$

When the imaging lens satisfies the conditional expression (13), it is achievable to restrain the chromatic aberration, the astigmatism, and the distortion within satisfactory ranges in a balanced manner. When the value exceeds the upper limit of −0.1, the chromatic aberration of magnification is excessively corrected. In addition, in the astigmatism, the sagittal image surface tilts to the object side, and the astigmatic difference increases.

In addition, the distortion increases in a positive direction. Therefore, it is difficult to obtain satisfactory image-forming performance. On the other hand, when the value is below the lower limit of −1.5, the axial chromatic aberration and the chromatic aberration of magnification are both insufficiently corrected. In addition, the astigmatism, the sagittal image surface tilts to the image plane side and the astigmatic difference increases. Therefore, it is difficult to obtain satisfactory image-forming performance.

According to an eleventh aspect of the invention, when the whole lens system has the focal length f and a distance along the optical axis between the front side lens group and the rear side lens group is Db, the imaging lens having the above-described configuration preferably satisfies the following conditional expression (14):

$$0.02 < Db/f < 0.1 \quad (14)$$

When the imaging lens satisfies the conditional expression (14), it is achievable to satisfactorily correct the astigmatism, the distortion, and the field curvature in a balanced manner. When the value exceeds the upper limit of 0.1, the distortion increases in a positive direction. In addition, the astigmatic difference increases. Therefore, it is difficult to obtain satisfactory image-forming performance.

On the other hand, when the value is below the lower limit of 0.02, the distortion increases in the negative direction. In addition, in the astigmatism, the sagittal image surface tilts to the object side and the astigmatic difference increases. The image-forming surface curves to the object side, and the field curvature is insufficiently corrected. Therefore, it is difficult to obtain satisfactory image-forming performance.

According to a twelfth aspect of the invention, when the whole lens system has the focal length f and the rear side lens group has the focal length Fr, the imaging lens having the above-described configuration preferably satisfies the following conditional expression (15):

$$1 < Fr/f < 10 \quad (15)$$

When the imaging lens satisfies the conditional expression (15), it is achievable to satisfactorily correct the chromatic aberration, the astigmatism, and the distortion, while downsizing the imaging lens. In addition, when the imaging lens satisfies the conditional expression (15), it is also achievable to restrain an incident angle of a light beam emitted from the imaging lens to an image plane of an imaging element within the range of a chief ray angle (CRA). As is well known, a so-called chief ray angle (CRA) is set in advance for an imaging element, i.e. a range of an incident angle of a light beam that can be taken in the image plane. When a light beam outside the range of CRA enters the imaging element, "shading" occurs, which is an obstacle for achieving satisfactory image-forming performance.

When the value exceeds the upper limit of 10 in the conditional expression (15), it is advantageous for downsizing of the imaging lens. However, since the astigmatic difference increases in the off-axis light fluxes, it is difficult to obtain satisfactory image-forming performance. On the other hand, when the value is below the lower limit of 1, it is easy to correct the chromatic aberration. However, the distortion increases in a positive direction and the astigmatic difference increases. Therefore, it is difficult to obtain satisfactory image-forming performance. Moreover, it is difficult to restrain the incident angle of a light beam emitted from the imaging lens within the range of CRA.

According to a thirteenth aspect of the invention, when the whole lens system has the focal length f and the fourth lens has a focal length f4, the imaging lens having the above-described configuration preferably satisfies the following conditional expression (16):

$$-3 < f4/f < -1 \quad (16)$$

When the imaging lens satisfies the conditional expression (16), it is achievable to satisfactorily correct the chromatic aberration, the astigmatism, the field curvature, and the distortion in a balanced manner. When the value exceeds the upper limit of −1, the axial chromatic aberration is excessively corrected and the chromatic aberration of magnification is insufficiently corrected. Moreover, in the astigmatism, the sagittal image surface tilts to the object side, and the astigmatic difference increases. The field curvature is insufficiently corrected. Therefore, it is difficult to obtain satisfactory image-forming performance.

On the other hand, when the value is below the lower limit of −3, the axial chromatic aberration and the chromatic aberration of magnification are both insufficiently corrected. In addition, in the astigmatism, the sagittal image surface tilts to the image plane side and the astigmatic difference increases. In addition, the field curvature is excessively corrected, and the distortion increases in the positive direction. Therefore, it is difficult to obtain satisfactory image-forming performance.

According to the imaging lens of the invention, the fifth lens is preferably the lens having the weakest refractive power in the second lens group.

Moreover, according to a fourteenth aspect of the invention, when the whole lens system has the focal length f and the fifth lens has a focal length f5, the imaging lens having the above-described configuration preferably satisfies the following conditional expression (17):

$$3 < |f5|/f < 60 \quad (17)$$

According to a fifteenth aspect of the invention, when the fourth lens has the focal length f4 and the sixth lens has a focal length f6, the imaging lens having the above-described configuration preferably satisfies the following conditional expression (18):

$$-1.3 < f4/f6 < -0.6 \quad (18)$$

When the imaging lens satisfies the conditional expression (18), it is achievable to satisfactorily restrain the chromatic aberration and the astigmatism within satisfactory range, while downsizing of the imaging lens. When the value exceeds the upper limit of −0.6, it is advantageous for downsizing of the imaging lens. However, it is difficult to secure the back focal length. Moreover, in the astigmatism, the sagittal image surface tilts to the object side and the astigmatic difference increases. Therefore, it is difficult to obtain satisfactory image-forming performance. On the other hand, when the value is below the lower limit of −1.3, the axial chromatic aberration and the chromatic aberration of magnification are both insufficiently corrected. In addition, in the astigmatism, the sagittal image surface tilts to the image plane side and the astigmatic difference increases. In addition, the field curvature is excessively corrected. Therefore, it is difficult to obtain satisfactory image-forming performance.

According to a sixteenth aspect of the invention, when the second lens group has the focal length F2 and the sixth lens has a focal length f6, the imaging lens of the invention preferably satisfies the following conditional expression (19):

$$-1.5 < f6/F2 < -0.1 \quad (19)$$

When the imaging lens satisfies the conditional expression (19), it is possible to restrain the chromatic aberration, the field curvature, and the distortion within satisfactory ranges in a balanced manner. When the value exceeds the upper limit of −0.1, the axial chromatic aberration and the chromatic aberration of magnification are both excessively corrected. Moreover, in the astigmatism, the sagittal image surface tilts to the image plane side, and the astigmatic difference increases. The field curvature is excessively corrected. In addition, the distortion increases in a positive direction. Therefore, it is difficult to obtain satisfactory image-forming performance. On the other hand, when the value is below the lower limit of −1.5, it is advantageous for correction of the chromatic aberration. However, in the astigmatism, the sagittal image surface tilts to the object side and the astigmatic difference increases. Therefore, it is difficult to obtain satisfactory image-forming performance.

When the imaging lens of the invention has an angle of view 2ω, the imaging lens preferably satisfies 70°≤2ω. When the imaging lens satisfies the conditional expression, the imaging lens can have a wider angle of view, and it is suitably achievable to attain both downsizing of the imaging lens and wider angle of view of the imaging lens.

According to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object side surface, a curvature radius of which is positive" means the object side surface is a convex surface. "An object side surface, a curvature radius of which is negative" means the object side surface is a concave surface. "An image plane side surface, a curvature radius of which is positive" means the image plane side surface is a concave surface. "An image plane side surface, a curvature radius of which is negative" means the image plane side surface is a convex surface. Here, a curvature radius used herein refers to a paraxial curvature radius, and may not fit to general shapes of the lenses in their sectional views all the time.

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of the imaging lenses in Numerical Data Examples 1 to 5 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
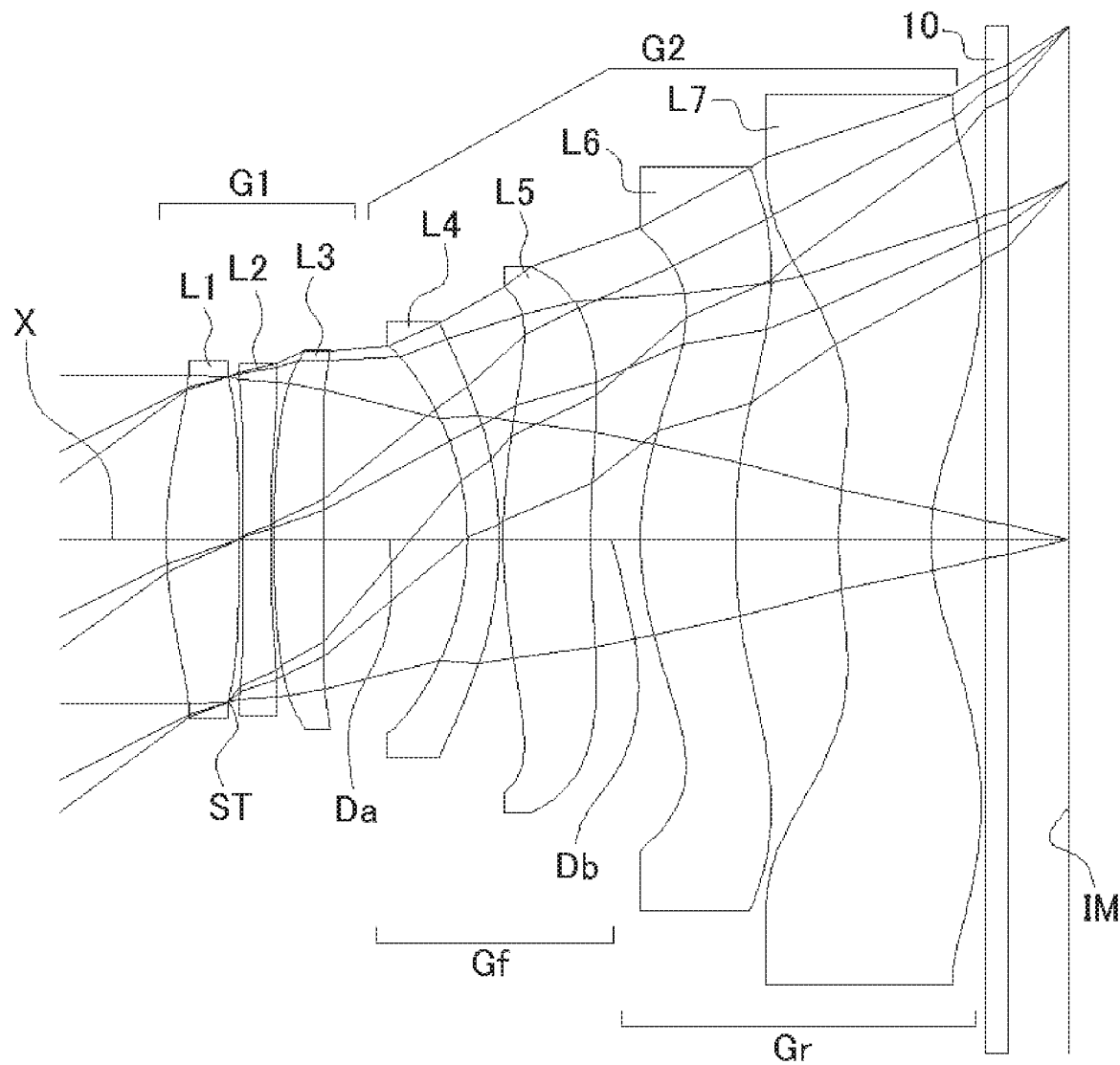
FIG. 1 shows a sectional view of a schematic configuration of an imaging lens in Numerical Data Example 1 according to an embodiment of the present invention.

As shown in FIG. 1, according to the embodiment, the imaging lens includes a first lens group G1 having positive refractive power, and a second lens group G2 having negative refractive power, arranged in the order from an object side to an image plane side. The second lens group G2 includes a front side lens group Gf having negative refractive power and a rear side lens group Gr having positive refractive power. Between the second lens group G2 and an image plane IM of an imaging element, there is provided a filter 10. The filter 10 is omissible.

The first lens group G1 includes a first lens L1 having positive refractive power, an aperture stop ST, a second lens L2 having negative refractive power, and a third lens L3 having positive refractive power, arranged in the order from an object side. According to the embodiment, in the imaging lens, there is provided the aperture stop ST on an image plane-side surface of the first lens L1. The position of the aperture stop ST is not limited to between the first lens L1 and the second lens L2 as in the imaging lens of Numerical Data Example 1. For example, the aperture stop ST may be disposed on the object side of the first lens L1. Accordingly, in case of a so-called "front aperture-type" lens configuration, in which the aperture stop ST is disposed on the object side of the imaging lens, it is achievable to improve assembling efficiency and to reduce the manufacturing cost of the imaging lens.

On the other hand, in case of a so-called "mid aperture-type" lens configuration, in which the aperture stop ST is disposed between the first lens L1 and the second lens L2 as in Numerical Data Example 1, an effective diameter of the first lens L1 is large in comparison with the total optical length of the imaging lens. As a result, the presence of the imaging lens in a camera is emphasized. Therefore, it is possible to appeal to users by the luxurious impression, high lens performance, etc. as a part of design of the camera.

In the first lens group G1, the first lens L1 is formed in a shape such that a curvature radius r1 of an object-side surface thereof is positive and a curvature radius r2 of an image plane-side surface thereof is negative, so as to have a shape of a biconvex lens near the optical axis X. The shape of the first lens L1 is not limited to the one in Numerical Data Example 1. The first lens L1 can be formed in any shape as long as the curvature radius r1 of the object-side surface thereof is positive. Therefore, the first lens L1 may be also formed in a shape, such that the curvature radius r2 is positive, so as to have a shape of a meniscus lens directing a convex surface thereof on the object side near an optical axis X.

The second lens L2 is formed in a shape such that a curvature radius r3 of an object-side surface thereof is negative and a curvature radius r4 of an image plane-side surface thereof is positive, so as to have a shape of a biconcave lens near the optical axis X. The shape of the second lens L2 is not limited to the one in Numerical Data Example 1. The second lens can be formed in any shape, as long as the curvature radius r3 of the object-side surface thereof is negative. Numerical Data Examples 2 through 4 are examples, in which the second lens L2 is formed in a shape, such that the curvature radius r4 is negative, i.e., so as to have a shape of a meniscus lens directing a concave surface thereof to the object side near the optical axis X.

The third lens L3 is formed in a shape such that a curvature radius r5 of an object-side surface thereof and a curvature radius r6 of an image plane-side surface thereof are both positive, so as to have a shape of a meniscus lens directing a convex surface thereof to the object side near the optical axis X. The shape of the third lens L3 is not limited to the one in Numerical Data Example 1. The third lens can be formed in any shape, as long as the curvature radius r5 of the object-side surface is positive. Numerical Data Examples 2 through 5 are examples, in which the third lens L3 is formed in a shape, such that the curvature radius r6 is negative, i.e., so as to have a shape of a biconvex lens near the optical axis X.

The second lens group G2 includes a fourth lens L4 having negative refractive power, a fifth lens L5 having positive refractive power, a sixth lens L6 having positive refractive power, and a seventh lens L7 having negative refractive power. In the second lens group G2, the fifth lens has the weakest refractive power. The second lens group G2 can be configured in any manner as long as the composite refractive power of those four lenses is negative. Numerical Data Examples 1 through 4 are examples of a lens configuration, in which the fifth lens L5 has positive refractive power in the second lens group G2. Numerical Data Example 5 is an example of a lens configuration, in which the fifth lens L5 has negative refractive power in the second lens group G2.

In the second lens group G2, the fourth lens L4 is formed in a shape such that a curvature radius r7 (=R4f) of an object-side surface thereof and a curvature radius r8 (=R4r) of an image plane-side surface thereof are both negative, so as to have a shape of a meniscus lens directing a concave surface thereof to the object side near the optical axis X. The shape of the fourth lens L4 is not limited to the one in Numerical Data Example 1. The fourth lens L4 can be formed in any shape, as long as the curvature radius r7 of the object-side surface is negative.

The fifth lens L5 is formed in a shape such that a curvature radius r9 of an object-side surface thereof and a curvature radius r10 of an image plane-side surface thereof are both positive, so as to have a shape of a meniscus lens directing a convex surface thereof to the object side near the optical axis X.

The sixth lens L6 is formed in a shape such that a curvature radius r11 of an object-side surface thereof and a curvature radius r12 of an image plane-side surface thereof are both positive, so as to have a shape of a meniscus lens directing a convex surface thereof to the object side near the optical axis X. The shape of the sixth lens L6 is not limited to the one in Numerical Data Example 1. The sixth lens L6 can be formed in any shape, as long as the curvature radius r11 of the object-side surface is positive. Numerical Data Example 4 is an example, in which the sixth lens L6 is formed in a shape, such that the curvature radius r12 is negative, i.e., so as to have a shape of a biconvex lens near the optical axis X.

The seventh lens L7 is formed in a shape such that a curvature radius r13 of an object-side surface thereof and a curvature radius r14 (=R7r) of an image plane-side surface thereof are both positive, so as to have a shape of a meniscus lens directing a convex surface thereof to the object side near the optical axis X. The shape of the seventh lens L7 is not limited to the one in Numerical Data Example 1. The seventh lens L7 can be formed in any shape, as long as the curvature radius r14 is positive. Numerical Data Example 4 is an example, in which the seventh lens L7 is formed in a shape, such that the curvature radius r13 is negative, i.e., so as to have a shape of a biconcave lens near the optical axis X.

In addition, in the fifth lens L5 through the seventh lens L7, both the object-side surfaces and the image plane-side surfaces thereof, or one of the object-side surfaces and the image plane-side surfaces are formed as aspheric shapes having inflexion points. In the imaging lens of Numerical Data Example 1, the fifth lens L5, the sixth lens L6, and the seventh lens L7 are formed as aspheric shapes having an inflexion point on the both surfaces of each of the fifth lens L5 through the seventh lens L7. With those shapes of the fifth lens L5 through the seventh lens L7, it is achievable to satisfactorily correct the off-axis chromatic aberration of magnification as well as the axial chromatic aberration. In addition, it is also achievable to suitably restrain an incident angle of a light beam emitted from the imaging lens to the image plane IM within the range of CRA. Here, depending on required optical performance or a required level of downsizing of the imaging lens, it is possible to form both the fifth lens L5 and the sixth lens L6 or one of the fifth lens L5 and the sixth lens L6 as aspheric shape(s) not having an inflexion point on the both surfaces thereof.

According to the embodiment, the imaging lens satisfies the following conditional expressions (1) to (19):

$$1.2 < La/f < 1.8 \tag{1}$$

$$1.3 < La/Hmax < 1.8 \tag{2}$$

$$0.05 < Da/f < 0.3 \tag{3}$$

$$35 < vd1 < 75 \tag{4}$$

$$15 < vd2 < 35 \tag{5}$$

$$35 < vd3 < 75 \tag{6}$$

$$-0.6 < R4f/f < -0.1 \tag{7}$$

$$-1.2 < R4r/f < -0.3 \tag{8}$$

$$0.2 < R7r/f < 0.6 \tag{9}$$

$$15 < vd4 < 35 \tag{10}$$

$$0.6 < F1/f < 1.3 \tag{11}$$

$$-8 < f2/F1 < -1.5 \tag{12}$$

$$-1.5 < Ff/Fr < -0.1 \tag{13}$$

$$0.02 < Db/f < 0.1 \tag{14}$$

$1 < Fr/f < 10$ (15)

$-3 < f4/f < -1$ (16)

$3 < |f5|/f < 60$ (17)

$-1.3 < f4/f6 < -0.6$ (18)

$-1.5 < f6/F2 < -0.1$ (19)

In the above conditional expressions,
f: Focal length of the whole lens system
f2: Focal length of a second lens L2
f4: Focal length of a fourth lens L4
f5: Focal length of a fifth lens L5
f6: Focal length of a sixth lens L6
F1: Focal length of a first lens group G1
F2: Focal length of a second lens group G2
Ff: Focal length of a front side lens group Gf
Fr: Focal length of a rear side lens group Gr
La: Distance on the optical axis X from an object-side surface of the first lens L1 to an image plane IM (length in air for a filter 10)
Da: Distance on the optical axis X between the first lens group G1 and the second lens group G2
Db: Distance on the optical axis X between the front side lens group Gf and the rear side lens group Gr
vd1: Abbe's number of the first lens L1
vd2: Abbe's number of the second lens L2
vd3: Abbe's number of the third lens L3
vd4: Abbe's number of the fourth lens L4
R4f: Curvature radius of an object-side surface of the fourth lens L4
R4r: Curvature radius of an image plane-side surface of the fourth lens L4
R7r: Curvature radius of an image plane-side surface of the seventh lens L7

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. The aspheric shapes of the lens surfaces are expressed as follows:

$$Z = \frac{C \cdot H^2}{1 + \sqrt{1 - (1+k) \cdot C^2 \cdot H^2}} + \sum (An \cdot H^n)$$

In the above formula,
Z: Distance on an optical axis
H: Distance from the optical axis in a direction perpendicular to the optical axis
C: Paraxial curvature (=1/r, r: paraxial curvature radius)
k: conic constant
An: n-order aspheric constant Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

Numerical Data Example 1

Basic Lens Data

TABLE 1

| | | f = 6.37 mm Fno = 2.1 ω = 36.5° | | | | |
|---|---|---|---|---|---|---|
| | i | r | d | nd | vd | [mm] |
| | | ∞ | ∞ | | | |
| L1 | 1* | 3.938 | 0.664 | 1.5346 | 56.1 | f1 = 6.732 |
| | 2* (ST) | −39.287 | 0.043 | | | |
| L2 | 3* | −20.392 | 0.249 | 1.6355 | 23.9 | f2 = −18.353 |
| | 4* | 27.375 | 0.030 | | | |
| L3 | 5* | 12.783 | 0.454 | 1.5346 | 56.1 | f3 = 27.920 |
| | 6* | 87.942 | 1.321 | (=Da) | | |
| L4 | 7* | −2.706 | 0.290 | 1.6355 | 23.9 | f4 = −12.700 |
| | 8* | −4.241 | 0.039 | | | |
| L5 | 9* | 5.324 | 0.804 | 1.5346 | 56.1 | f5 = 23.008 |
| | 10* | 8.893 | 0.458 | (=Db) | | |
| L6 | 11* | 3.023 | 0.870 | 1.5346 | 56.1 | f6 = 10.154 |
| | 12* | 6.139 | 0.948 | | | |
| L7 | 13* | 3.899 | 0.846 | 1.5346 | 56.1 | f7 = −8.371 |
| | 14* | 1.926 | 0.500 | | | |
| | 15 | ∞ | 0.210 | 1.5168 | 64.2 | |
| | 16 | ∞ | 0.560 | | | |
| (IM) | | ∞ | | | | |

Hmax=4.71
La=8.214
F1=7.631
F2=−31.267
Ff=−27.920
Fr=58.077

Aspheric Surface Data

TABLE 2

| i | k | A4 | A6 | A8 | A10 | A12 | A14 | A16 |
|---|---|---|---|---|---|---|---|---|
| 1 | 0 | −9.524E−03 | −3.649E−03 | −1.721E−04 | 5.316E−05 | −1.331E−05 | −5.864E−06 | 1.745E−06 |
| 2 | 0 | 1.733E−02 | −4.592E−02 | 2.795E−02 | −8.522E−03 | 1.216E−03 | −6.720E−05 | 3.155E−06 |
| 3 | 0 | 5.529E−02 | −6.343E−02 | 3.238E−02 | −8.938E−03 | 1.114E−03 | 8.147E−06 | −9.325E−06 |
| 4 | 0 | 5.100E−02 | −4.564E−02 | 1.684E−02 | −3.284E−03 | 3.997E−05 | 1.961E−04 | −3.990E−05 |
| 5 | 0 | 1.637E−02 | −1.257E−02 | 7.554E−03 | −9.676E−04 | −1.287E−05 | −2.479E−05 | 5.859E−06 |
| 6 | 0 | −8.571E−03 | 2.437E−03 | 3.153E−03 | −9.565E−04 | 5.912E−06 | 1.579E−05 | −1.306E−06 |
| 7 | 0 | −1.729E−02 | 4.024E−03 | 2.953E−03 | −8.843E−04 | −7.623E−05 | 1.622E−05 | 4.166E−08 |
| 8 | 0 | −2.763E−02 | 8.731E−03 | −4.653E−04 | 3.822E−04 | −1.862E−04 | 7.797E−06 | 3.073E−06 |
| 9 | 0 | −1.238E−02 | 5.084E−04 | −2.256E−05 | −3.302E−06 | −9.424E−06 | 1.855E−06 | −3.141E−07 |
| 10 | 0 | −1.407E−02 | −1.314E−03 | 1.460E−04 | 1.880E−06 | 4.684E−07 | −6.436E−07 | −1.461E−08 |
| 11 | 0 | −1.483E−02 | −1.411E−03 | −6.919E−06 | −1.842E−05 | 4.691E−07 | 3.865E−07 | −3.283E−08 |
| 12 | 0 | 7.722E−03 | −3.831E−03 | 3.406E−04 | −7.814E−06 | −2.073E−07 | −1.517E−08 | 1.388E−09 |
| 13 | 0 | −6.169E−02 | 5.589E−03 | −1.484E−04 | −2.147E−06 | −8.704E−08 | 1.393E−08 | −4.180E−10 |
| 14 | −3.763 | −2.616E−02 | 3.300E−03 | −2.298E−04 | 6.135E−06 | 1.552E−07 | −1.233E−08 | 2.098E−10 |

The values of the respective conditional expressions are as follows:

$La/f$=1.29

$La/H$max=1.74

$Da/f$=0.21

$R4f/f$=−0.42

$R4r/f$=−0.67

$R7r/f$=0.30

$F1/f$=1.20

$f2/F1$=−2.41

$Ff/Fr$=−0.48

$Db/f$=0.07

$Fr/f$=9.12

$f4/f$=−1.99

$|f5|/f$=3.61

$f4/f6$=−1.25

$f6/F2$=−0.32

Accordingly, the imaging lens of Numerical Data Example 1 satisfies the above-described conditional expressions.

Figure 2:
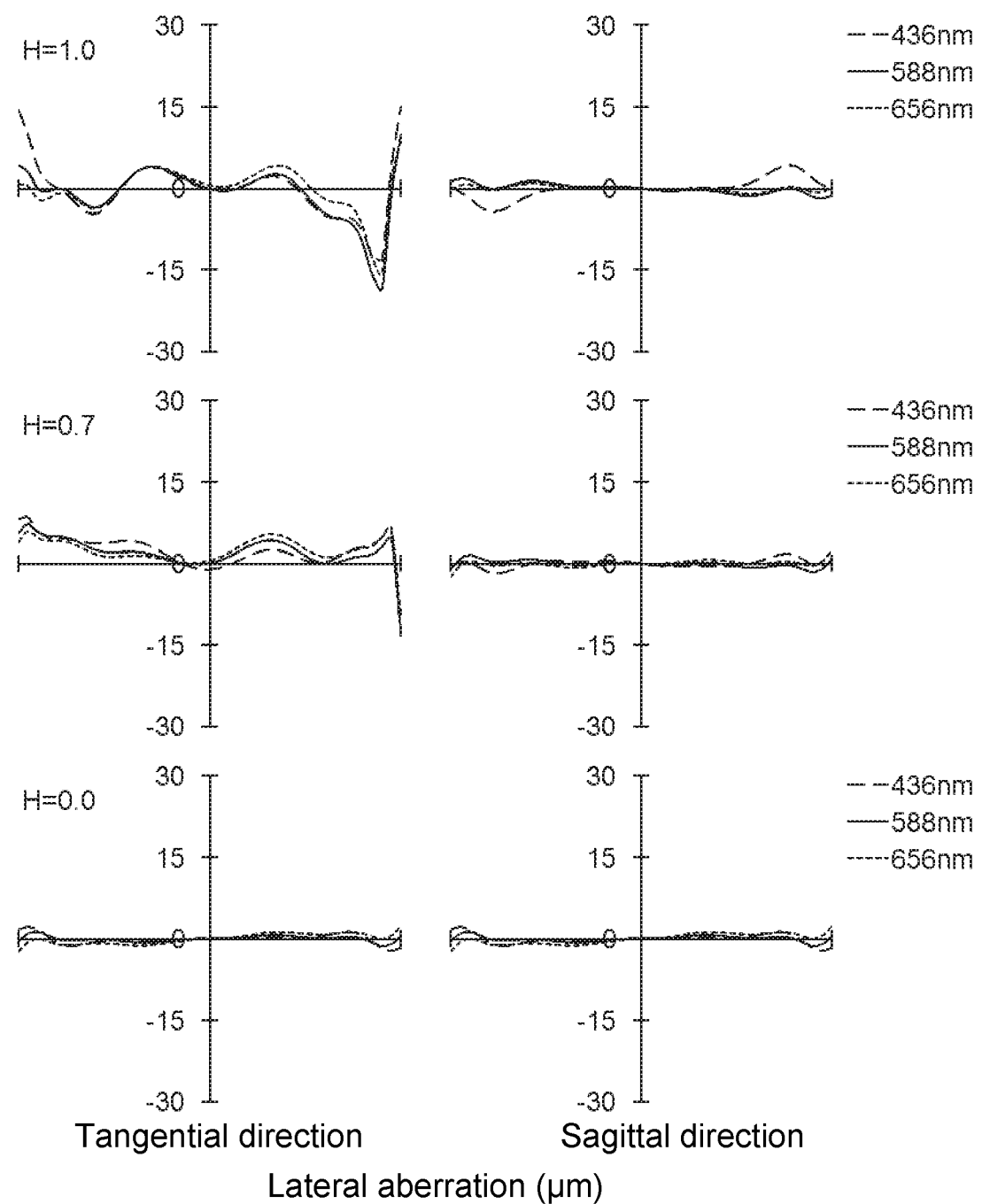
FIG. 2 is an aberration diagram showing a lateral aberration of the imaging lens of FIG. 1.
Figure 3:
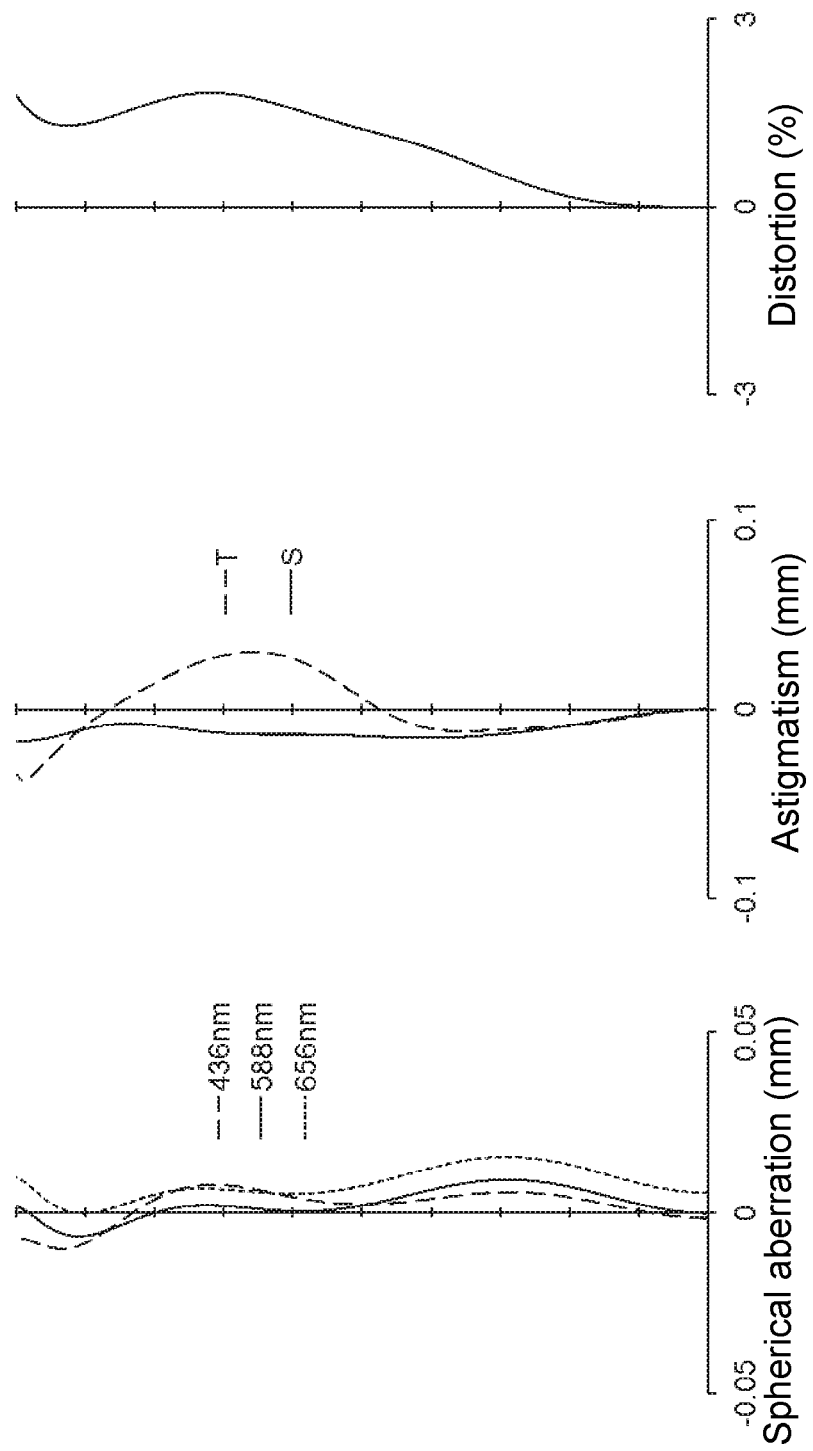
FIG. 3 is an aberration diagram showing a spherical aberration, astigmatism, and a distortion of the imaging lens of FIG. 1.
Figure 4:
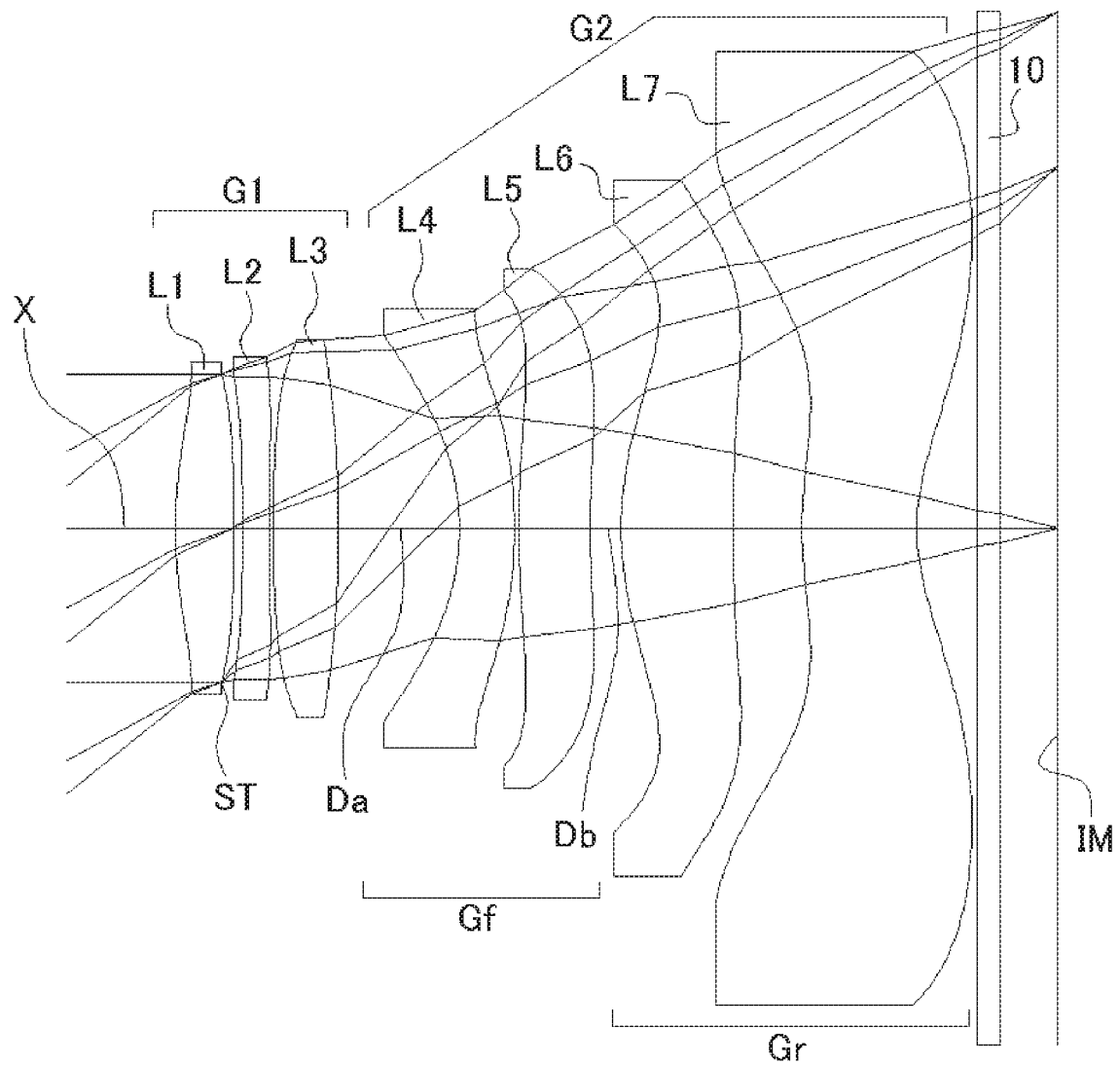
FIG. 4 shows a sectional view of a schematic configuration of an imaging lens in Numerical Data Example 2 according to the embodiment of the present invention.

FIG. 2 shows a lateral aberration that corresponds to a ratio H of each image height to the maximum image height Hmax (hereinafter referred to as "image height ratio H"), which is divided into a tangential direction and a sagittal direction (The same is true for FIGS. 5, 8, 11, and 14). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, and 15). As shown in FIGS. 2 and 3, according to the imaging lens of Numerical Data Example 1, the aberrations are satisfactorily corrected.

Numerical Data Example 2

Basic Lens Data

TABLE 3

| | | f = 5.86 mm Fno = 2.1 ω = 38.8° | | | | |
|---|---|---|---|---|---|---|
| | i | r | d | nd | vd | [mm] |
| | | ∞ | ∞ | | | |
| L1 | 1* | 4.247 | 0.530 | 1.5346 | 56.1 | f1 = 6.562 |
| | 2* (ST) | −19.282 | 0.082 | | | |
| L2 | 3* | −12.336 | 0.250 | 1.6355 | 23.9 | f2 = −29.787 |
| | 4* | −35.693 | 0.030 | | | |
| L3 | 5* | 21.621 | 0.593 | 1.5346 | 56.1 | f3 = 17.006 |
| | 6* | −15.538 | 1.104 | (=Da) | | |
| L4 | 7* | −2.332 | 0.502 | 1.6355 | 23.9 | f4 = −7.972 |
| | 8* | −4.683 | 0.040 | | | |
| L5 | 9* | 8.514 | 0.651 | 1.5346 | 56.1 | f5 = 243.113 |
| | 10* | 8.868 | 0.283 | (=Db) | | |
| L6 | 11* | 3.047 | 1.022 | 1.5346 | 56.1 | f6 = 6.676 |
| | 12* | 18.389 | 0.630 | | | |
| L7 | 13* | 3.882 | 1.047 | 1.5346 | 56.1 | f7 = −9.130 |
| | 14* | 1.959 | 0.550 | | | |
| | 15 | ∞ | 0.210 | 1.5168 | 64.2 | |
| | 16 | ∞ | 0.527 | | | |
| (IM) | | ∞ | | | | |

Hmax=4.71

La=7.979

F1=5.779

F2=−15.842

Ff=−8.053

Fr=10.953

Aspheric Surface Data

TABLE 4

| i | k | A4 | A6 | A8 | A10 | A12 | A14 | A16 |
|---|---|---|---|---|---|---|---|---|
| 1 | 0 | −1.264E−02 | −5.082E−03 | −6.651E−04 | 1.405E−04 | −3.972E−05 | −1.534E−05 | 1.483E−05 |
| 2 | 0 | 1.818E−02 | −4.778E−02 | 2.785E−02 | −8.590E−03 | 1.170E−03 | 4.453E−05 | −1.634E−05 |
| 3 | 0 | 5.092E−02 | −6.629E−02 | 3.599E−02 | −1.131E−02 | 1.933E−03 | −2.911E−05 | −3.224E−05 |
| 4 | 0 | 4.735E−02 | −4.459E−02 | 1.663E−02 | −3.167E−03 | 1.456E−05 | 1.926E−04 | −4.147E−05 |
| 5 | 0 | 2.314E−02 | −1.340E−02 | 6.956E−03 | −1.123E−03 | 7.064E−05 | −2.643E−05 | 3.924E−06 |
| 6 | 0 | −1.327E−02 | 2.457E−03 | 1.706E−03 | −7.143E−04 | 6.572E−05 | 1.442E−06 | 4.841E−09 |
| 7 | 0 | −1.401E−02 | 6.281E−03 | 3.671E−03 | −9.785E−04 | −1.194E−04 | 2.181E−05 | 6.022E−06 |
| 8 | 0 | −2.634E−02 | 9.741E−03 | −4.836E−04 | 3.794E−04 | −1.563E−04 | 8.296E−06 | 1.995E−06 |
| 9 | 0 | −1.307E−02 | −5.845E−05 | −5.725E−05 | 1.391E−06 | −8.526E−06 | 1.623E−06 | −3.398E−07 |
| 10 | 0 | −2.203E−02 | −1.065E−03 | 1.218E−04 | −3.888E−06 | 6.221E−07 | −6.052E−07 | 1.624E−08 |
| 11 | 0 | −1.995E−02 | −9.270E−04 | −4.110E−05 | −1.979E−05 | 8.362E−07 | 4.005E−07 | −3.072E−08 |
| 12 | 0 | 8.237E−03 | −4.140E−03 | 3.346E−03 | −6.210E−06 | −2.274E−07 | −3.262E−09 | 1.169E−09 |
| 13 | 0 | −6.342E−02 | 5.772E−03 | −1.509E−04 | −2.142E−06 | −8.095E−08 | −4.799E−09 | 7.192E−10 |
| 14 | −3.745 | −2.391E−02 | 2.985E−03 | −1.995E−04 | 4.986E−06 | 1.627E−07 | −1.316E−08 | 2.278E−10 |

The values of the respective conditional expressions are as follows:

$La/f=1.36$ $La/Hmax=1.69$ $Da/f=0.19$ $R4f/f=-0.40$ $R4r/f=-0.80$ $R7r/f=0.33$ $F1/f=0.99$ $f2/F1=-5.15$ $Ff/Fr=-0.74$ $Db/f=0.05$ $Fr/f=1.87$ $f4/f=-1.36$ $|f5|/f=41.49$ $f4/f6=-1.19$ $f6/F2=-0.42$ Accordingly, the imaging lens of Numerical Data Example 2 satisfies the above-described conditional expressions.

Figure 5:
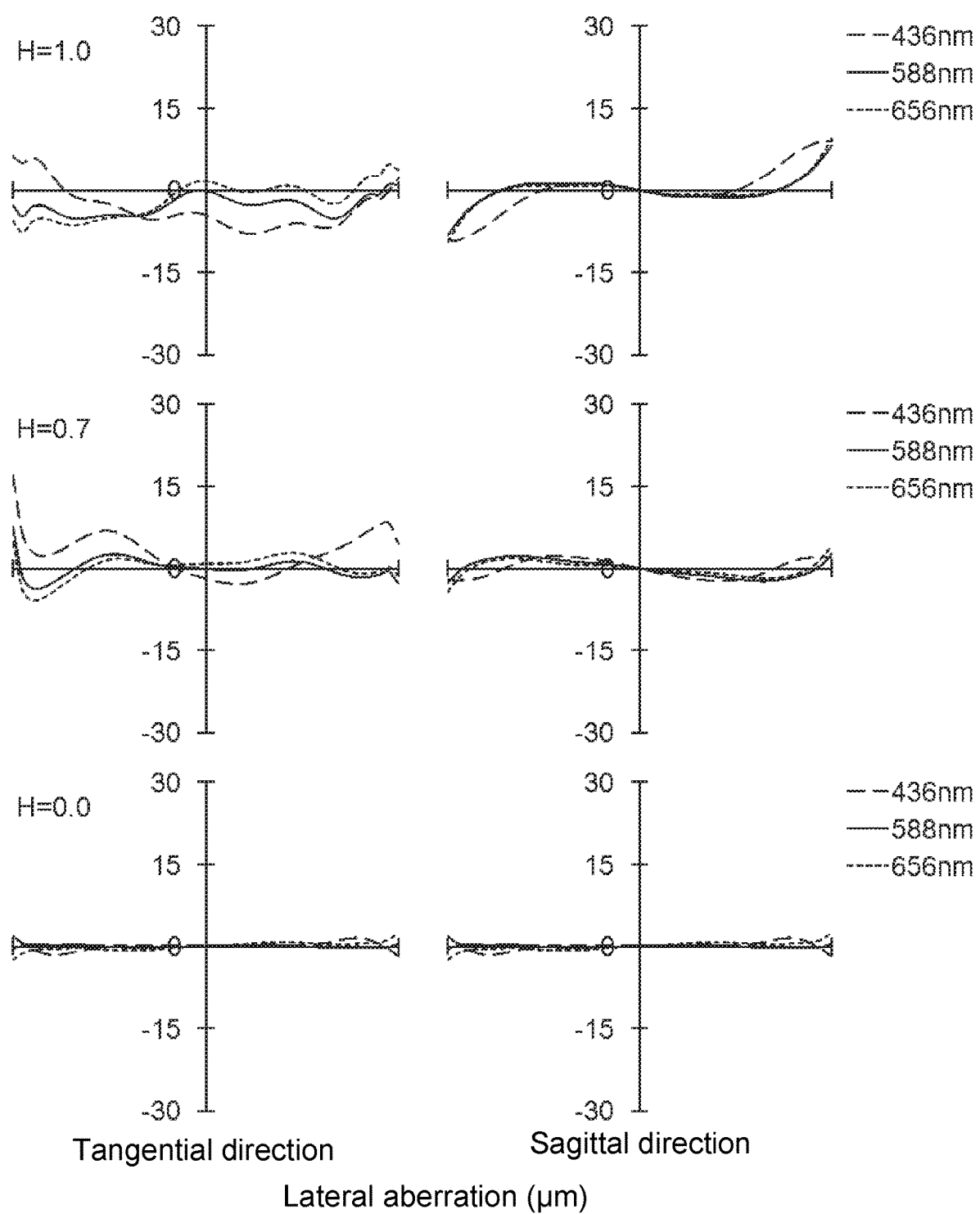
FIG. 5 is an aberration diagram showing a lateral aberration of the imaging lens of FIG. 4.
Figure 6:
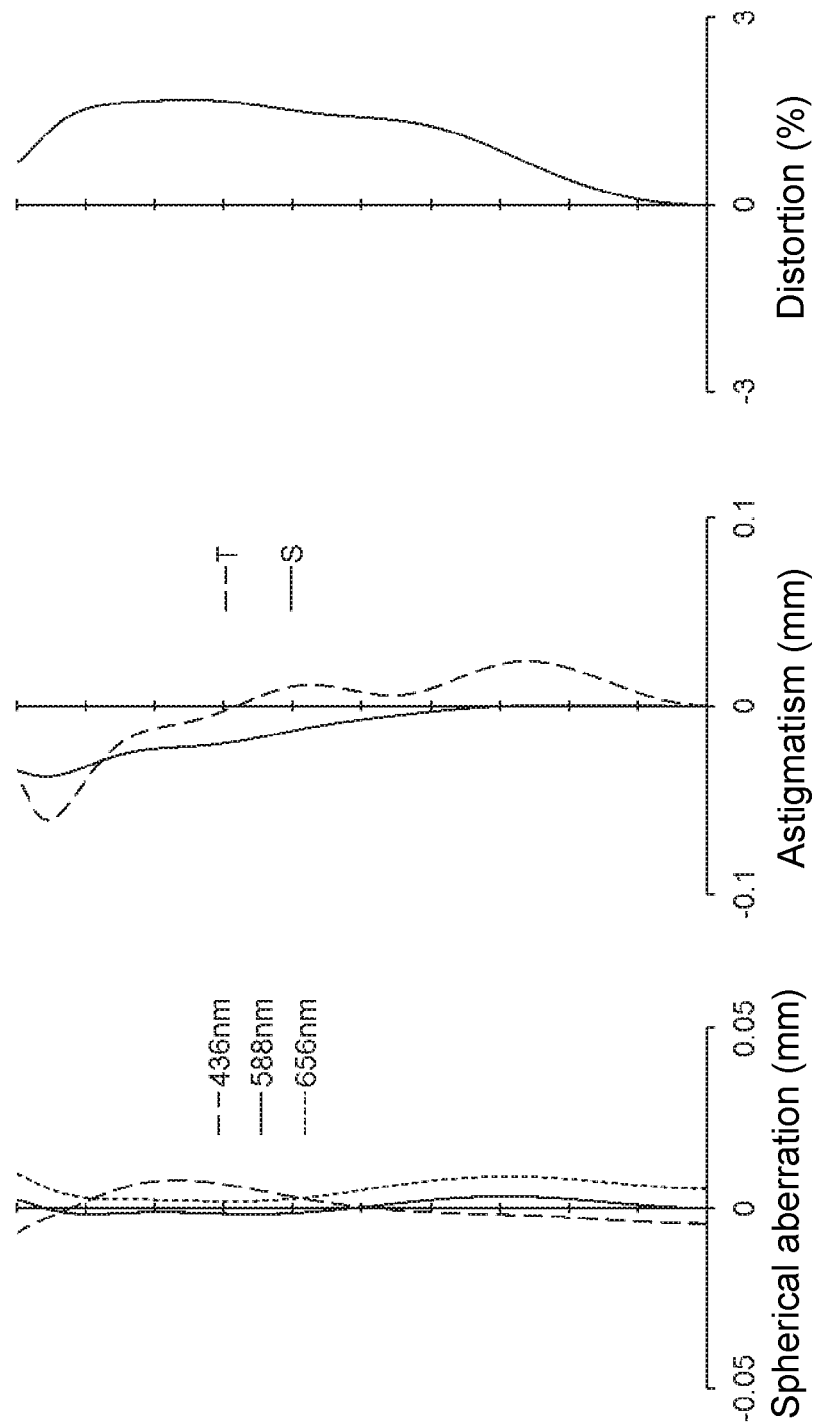
FIG. 6 is an aberration diagram showing a spherical aberration, astigmatism, and a distortion of the imaging lens of FIG. 4.
Figure 7:
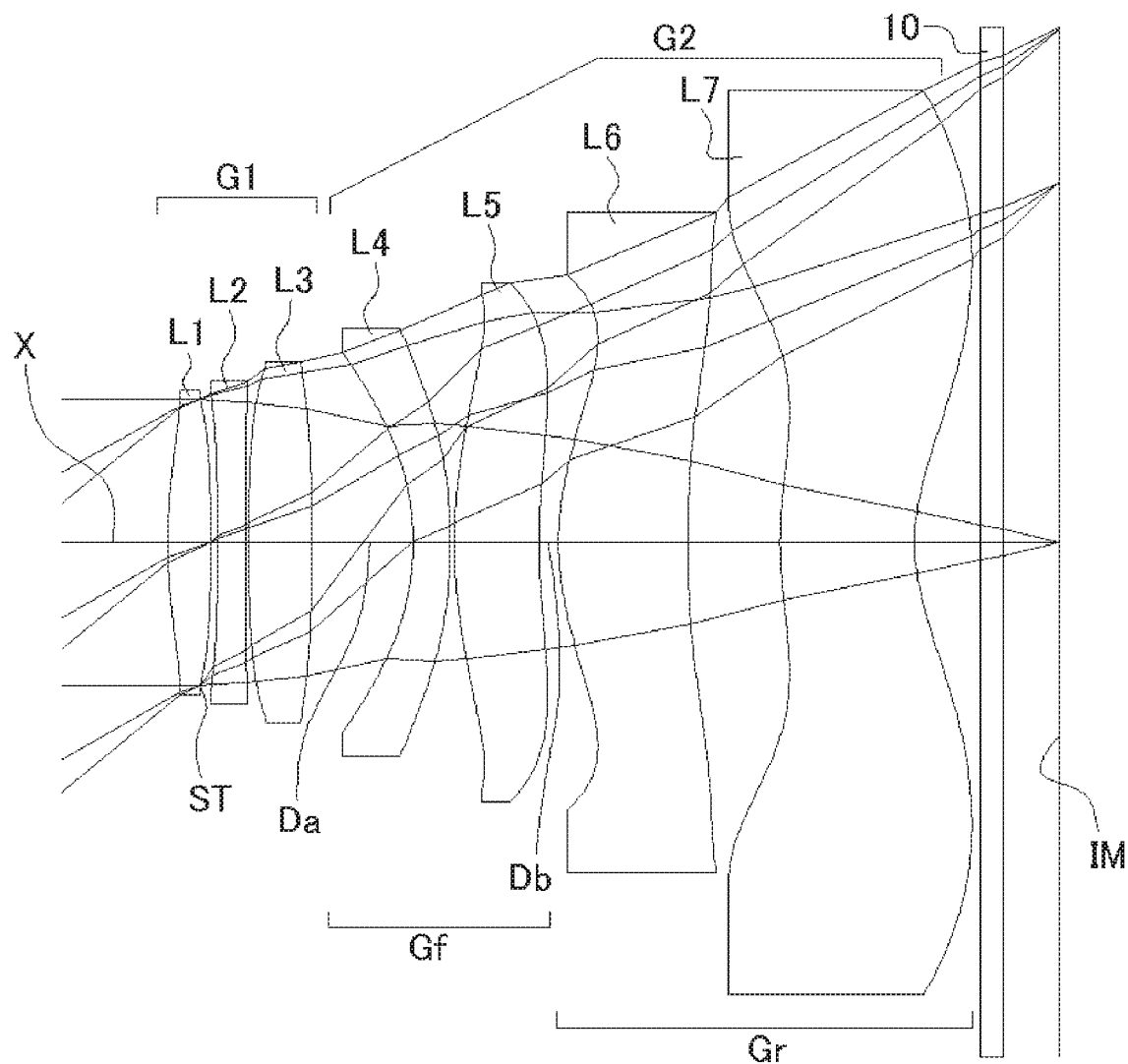
FIG. 7 shows a sectional view of a schematic configuration of an imaging lens in Numerical Data Example 3 according to the embodiment of the present invention.

FIG. 5 shows a lateral aberration that corresponds to the image height ratio H, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic Lens Data

TABLE 5

| | i | r | d | nd | νd | [mm] |
|---|---|---|---|---|---|---|
| | | $\infty$ | $\infty$ | | | |
| L1 | 1* | 5.165 | 0.393 | 1.5346 | 56.1 | f1 = 7.067 |
| | 2* (ST) | -13.697 | 0.064 | | | |
| L2 | 3* | -12.318 | 0.250 | 1.6355 | 23.9 | f2 = -29.059 |
| | 4* | -37.287 | 0.027 | | | |
| L3 | 5* | 20.086 | 0.576 | 1.5346 | 56.1 | f3 = 31.583 |
| | 6* | -104.860 | 0.930 (=Da) | | | |
| L4 | 7* | -2.544 | 0.337 | 1.6355 | 23.9 | f4 = -7.823 |
| | 8* | -5.479 | 0.040 | | | |
| L5 | 9* | 4.743 | 0.773 | 1.5346 | 56.1 | f5 = 34.776 |
| | 10* | 6.006 | 0.178 (=Db) | | | |
| L6 | 11* | 2.656 | 1.180 | 1.5346 | 56.1 | f6 = 6.236 |
| | 12* | 11.041 | 0.842 | | | |
| L7 | 13* | 3.699 | 1.231 | 1.5346 | 56.1 | f7 = -9.377 |
| | 14* | 1.881 | 0.600 | | | |
| | 15 | $\infty$ | 0.210 | 1.5168 | 64.2 | |
| | 16 | $\infty$ | 0.507 | | | |
| (IM) | | $\infty$ | | | | | f = 5.79 mm Fno = 2.2 ω = 39.1°

Hmax=4.71
La=8.066
F1=7.260
F2=-53.458
Ff=-9.692
Fr=8.253

Aspheric Surface Data

TABLE 6

| i | k | A4 | A6 | A8 | A10 | A12 | A14 | A16 |
|---|---|---|---|---|---|---|---|---|
| 1 | 0 | -1.094E-02 | -4.386E-03 | -5.344E-04 | 1.609E-04 | -3.619E-05 | -1.860E-05 | 9.232E-06 |
| 2 | 0 | 2.101E-02 | -4.684E-02 | 2.797E-02 | -8.624E-03 | 1.140E-03 | 3.033E-05 | -1.788E-05 |
| 3 | 0 | 5.345E-02 | -6.616E-02 | 3.609E-02 | -1.125E-02 | 1.945E-03 | -3.350E-05 | -3.693E-05 |
| 4 | 0 | 5.127E-02 | -4.407E-02 | 1.677E-02 | -3.111E-03 | 3.625E-05 | 1.950E-04 | -4.313E-05 |
| 5 | 0 | 1.904E-02 | -1.314E-02 | 7.050E-03 | -1.111E-03 | 7.178E-05 | -2.641E-05 | 4.362E-06 |
| 6 | 0 | -2.231E-02 | 2.784E-03 | 1.788E-03 | -6.986E-04 | 7.193E-05 | 2.267E-06 | -4.848E-07 |
| 7 | 0 | -1.632E-02 | 4.605E-03 | 3.685E-03 | -9.116E-04 | -1.098E-04 | 1.800E-05 | 4.218E-06 |
| 8 | 0 | -3.033E-02 | 8.741E-03 | -6.101E-04 | 3.569E-04 | -1.586E-04 | 8.677E-06 | 2.027E-06 |
| 9 | 0 | -1.129E-02 | 7.423E-04 | -2.441E-05 | -3.801E-06 | -9.774E-06 | 1.742E-06 | -1.832E-07 |
| 10 | 0 | -2.230E-02 | -3.067E-04 | 1.750E-04 | -1.477E-05 | -1.374E-06 | -5.129E-07 | 5.729E-08 |
| 11 | 0 | -2.974E-02 | -1.253E-04 | -1.675E-04 | -3.670E-05 | 4.570E-08 | 4.003E-07 | -3.680E-08 |
| 12 | 0 | 9.254E-03 | -3.571E-03 | 3.443E-04 | -6.766E-06 | -3.424E-07 | -1.826E-08 | 2.515E-09 |
| 13 | 0 | -6.145E-02 | 5.587E-03 | -1.488E-04 | -1.563E-06 | -3.590E-08 | -5.686E-09 | 4.612E-10 |
| 14 | -3.649 | -2.336E-02 | 2.890E-03 | -2.031E-04 | 5.199E-06 | 1.752E-07 | -1.298E-08 | 2.020E-10 |

The values of the respective conditional expressions are as follows:

$La/f = 1.39$ $La/Hmax = 1.71$ $Da/f = 0.16$ $R4f/f = -0.44$ $R4r/f = -0.95$ $R7r/f = 0.32$ $F1/f = 1.25$ $f2/F1 = -4.00$ $Ff/Fr = -1.17$ $Db/f = 0.03$ $Fr/f = 1.43$ $f4/f = -1.35$ $|f5|/f = 6.01$ $f4/f6 = -1.25$ $f6/F2 = -0.12$ Accordingly, the imaging lens of Numerical Data Example 3 satisfies the above-described conditional expressions.

Figure 8:
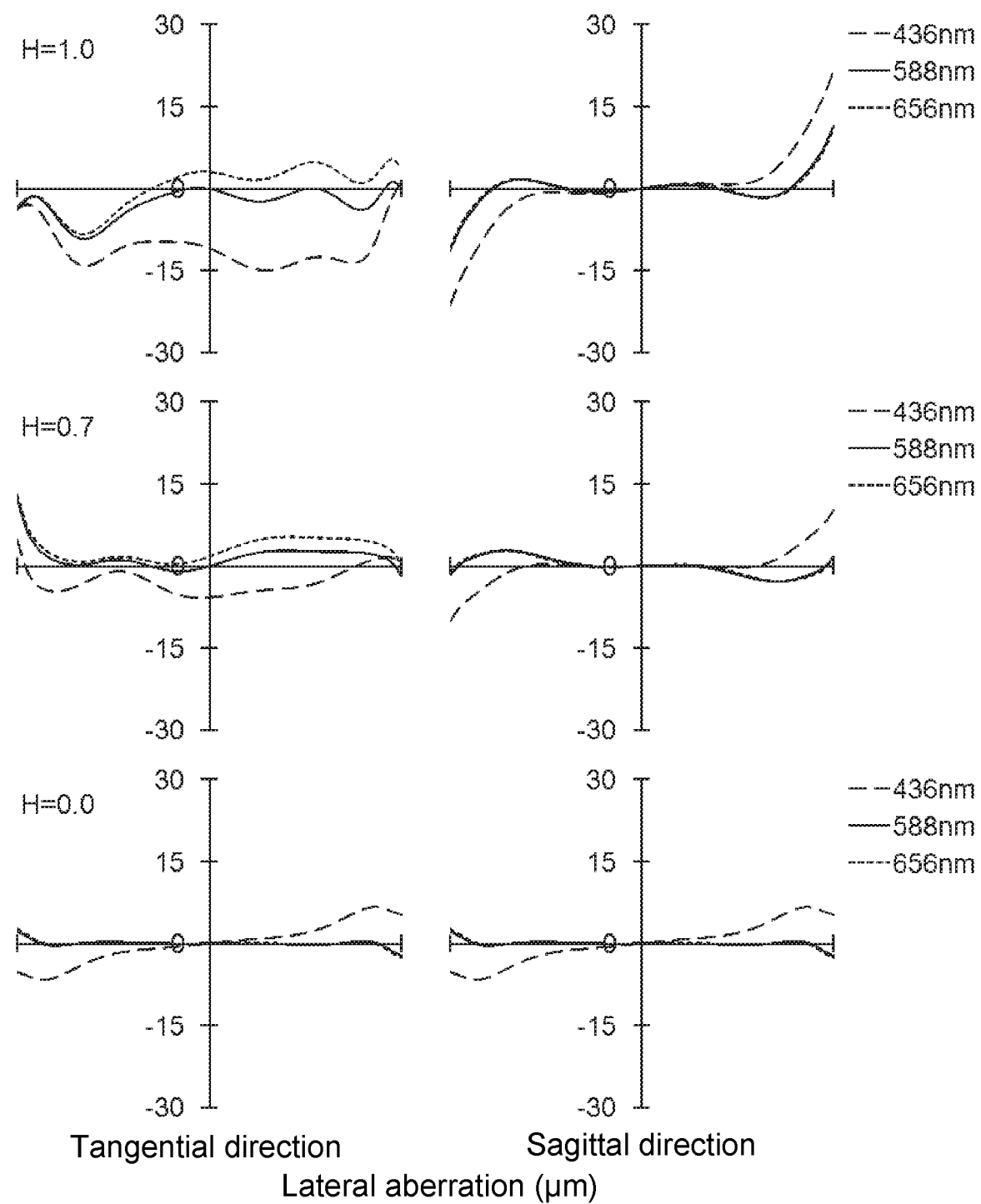
FIG. 8 is an aberration diagram showing a lateral aberration of the imaging lens of FIG. 7.
Figure 9:
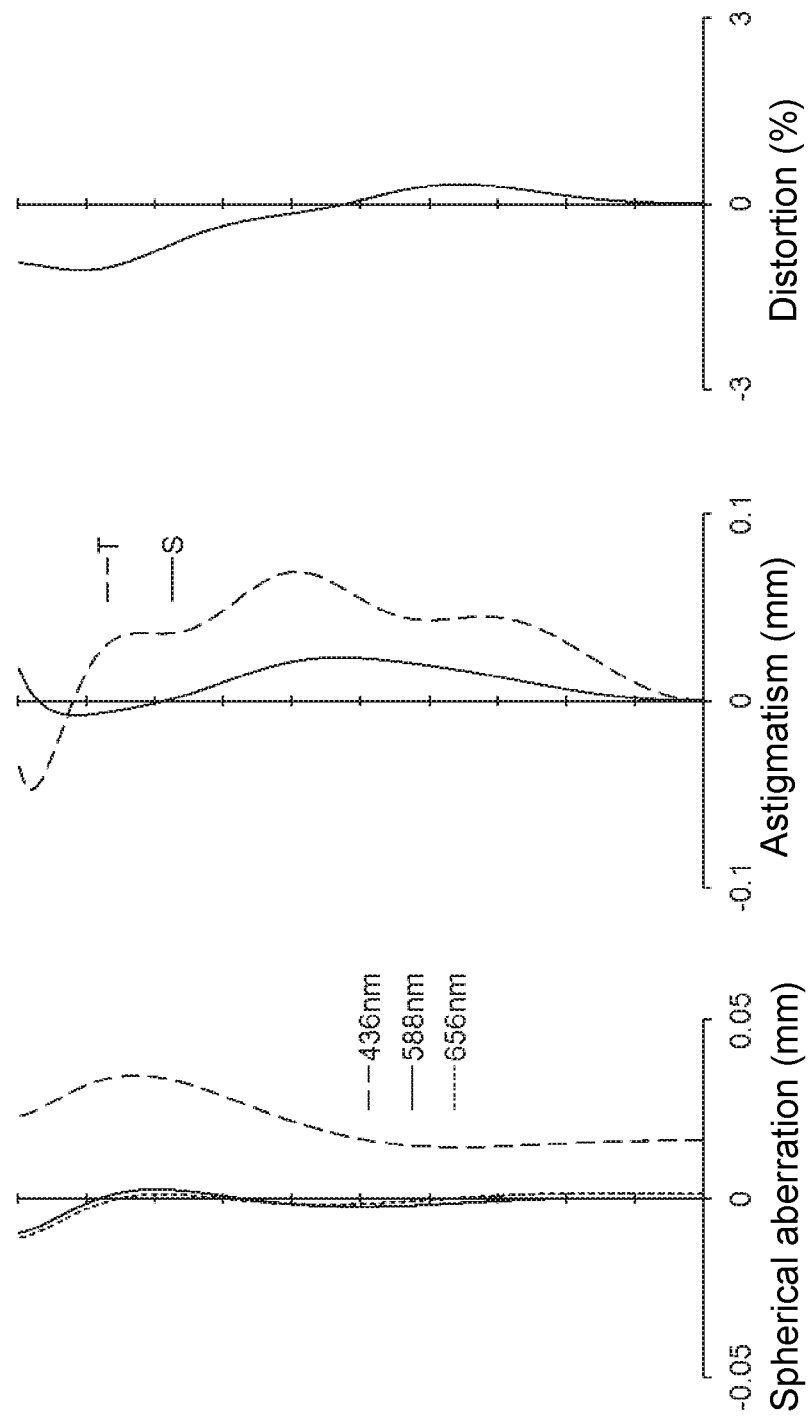
FIG. 9 is an aberration diagram showing a spherical aberration, astigmatism, and a distortion of the imaging lens of FIG. 7.
Figure 10:
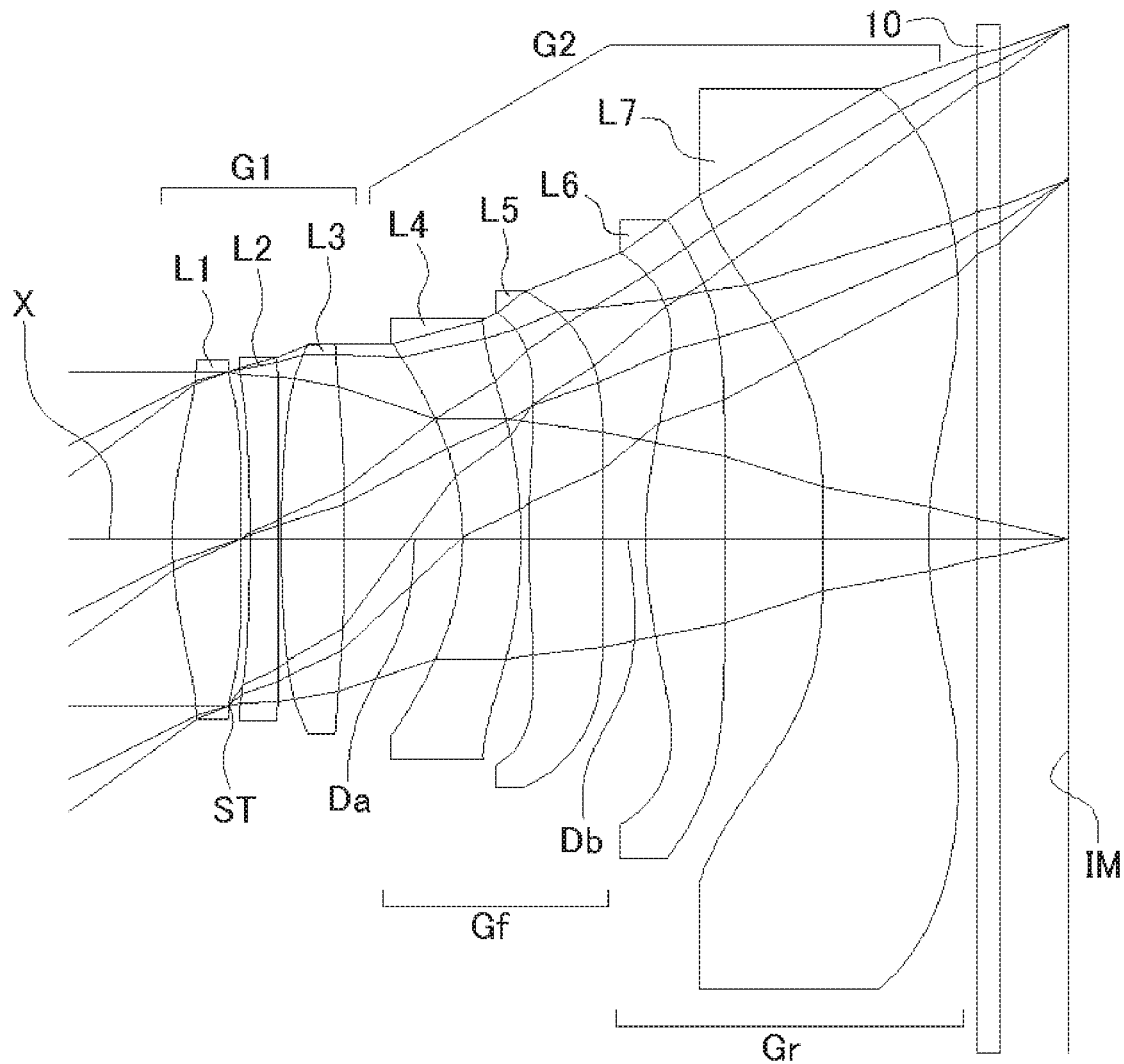
FIG. 10 shows a sectional view of a schematic configuration of an imaging lens in Numerical Data Example 4 according to the embodiment of the present invention.

FIG. 8 shows a lateral aberration that corresponds to the image height ratio H, and FIG. 9 shows a spherical aberration (mm), astigmatism (mm), and a distortion (%), respectively. As shown in FIGS. 8 and 9, according to the imaging lens of Numerical Data Example 3, the aberrations are also satisfactorily corrected.

Numerical Data Example 4

Basic Lens Data

TABLE 7

| f = 6.37 mm Fno = 2.1 ω = 36.5° | | | | | | |
|---|---|---|---|---|---|---|
| | i | r | d | nd | νd | [mm] |
| L1 | 1* | 3.767 | 0.626 | 1.5346 | 56.1 | f1 = 6.613 |
| | 2* (ST) | -54.068 | 0.080 | | | |
| L2 | 3* | -11.579 | 0.254 | 1.6355 | 23.9 | f2 = -27.758 |
| | 4* | -33.982 | 0.030 | | | |
| L3 | 5* | 13.110 | 0.578 | 1.5346 | 56.1 | f3 = 17.789 |
| | 6* | -34.097 | 1.080 (=Da) | | | |
| L4 | 7* | -2.595 | 0.531 | 1.6355 | 23.9 | f4 = -8.588 |
| | 8* | -5.340 | 0.071 | | | |
| L5 | 9* | 8.461 | 0.670 | 1.5346 | 56.1 | f5 = 26.534 |
| | 10* | 20.390 | 0.396 (=Db) | | | |
| L6 | 11* | 3.908 | 0.726 | 1.5346 | 56.1 | f6 = 6.842 |
| | 12* | -53.272 | 0.892 | | | |
| L7 | 13* | -100.605 | 0.960 | 1.5346 | 56.1 | f7 = -5.556 |
| | 14* | 3.071 | 0.450 | | | |
| | 15 | ∞ | 0.210 | 1.5168 | 64.2 | |
| | 16 | ∞ | 0.616 | | | |
| (IM) | | ∞ | | | | |

Hmax=4.71
La=8.098
F1=5.960
F2=-11.913
Ff=-13.024
Fr=58.076
Aspheric Surface Data

TABLE 8

| i | k | A4 | A6 | A8 | A10 | A12 | A14 | A16 |
|---|---|---|---|---|---|---|---|---|
| 1 | 0 | -9.250E-03 | -4.217E-03 | -1.604E-04 | 1.137E-04 | -9.526E-05 | -2.606E-05 | 1.481E-05 |
| 2 | 0 | 1.200E-02 | -4.517E-02 | 2.779E-02 | -8.608E-03 | 1.105E-03 | 3.494E-05 | -1.162E-05 |
| 3 | 0 | 5.142E-02 | -6.318E-02 | 3.517E-02 | -1.130E-02 | 1.884E-03 | -2.973E-05 | -2.281E-05 |
| 4 | 0 | 5.179E-02 | -4.356E-02 | 1.625E-02 | -3.173E-03 | 3.828E-06 | 1.945E-04 | -3.704E-05 |
| 5 | 0 | 1.451E-02 | -1.389E-02 | 7.260E-03 | -1.099E-03 | 1.207E-04 | -3.821E-05 | 4.104E-06 |
| 6 | 0 | -1.623E-02 | 3.820E-03 | 1.098E-03 | -4.868E-04 | 5.218E-05 | -1.199E-06 | 3.269E-09 |
| 7 | 0 | -1.079E-02 | 4.811E-03 | 2.115E-03 | -3.571E-04 | -1.688E-04 | 9.883E-06 | 6.453E-06 |
| 8 | 0 | -2.524E-02 | 9.124E-03 | -5.580E-04 | 2.475E-04 | -1.174E-04 | 9.584E-06 | 1.122E-06 |
| 9 | 0 | -1.863E-02 | 1.062E-05 | -2.786E-04 | -4.143E-06 | -1.028E-05 | 1.506E-06 | -6.955E-07 |
| 10 | 0 | -1.545E-02 | -3.165E-03 | 1.732E-04 | 1.233E-05 | -1.601E-06 | -1.334E-06 | -3.675E-09 |
| 11 | 0 | -1.712E-02 | 7.142E-05 | -2.383E-04 | -2.020E-05 | 4.869E-06 | 2.348E-07 | -5.874E-08 |
| 12 | 0 | 5.335E-03 | -2.690E-03 | 1.764E-04 | -1.881E-06 | -8.073E-08 | -4.802E-09 | 1.438E-09 |
| 13 | 0 | -4.503E-02 | 4.602E-03 | -4.544E-05 | -5.327E-06 | -3.290E-07 | -5.447E-09 | 1.870E-09 |
| 14 | -6.853 | -1.842E-02 | 2.240E-03 | -1.570E-04 | 4.092E-06 | 1.001E-07 | -7.956E-09 | 1.096E-10 |

The values of the respective conditional expressions are as follows:

$La/f=1.27$ $La/H\max=1.72$ $Da/f=0.17$ $R4f/f=-0.41$ $R4r/f=-0.84$ $R7r/f=0.48$ $F1/f=0.94$ $f2/F1=-4.66$ $Ff/Fr=-0.22$ $Db/f=0.06$ $Fr/f=9.12$ $f4/f=-1.35$ $|f5|/f=4.17$ $f4/f6=-1.26$ $f6/F2=-0.57$ Accordingly, the imaging lens of Numerical Data Example 4 satisfies the above-described conditional expressions.

Figure 11:
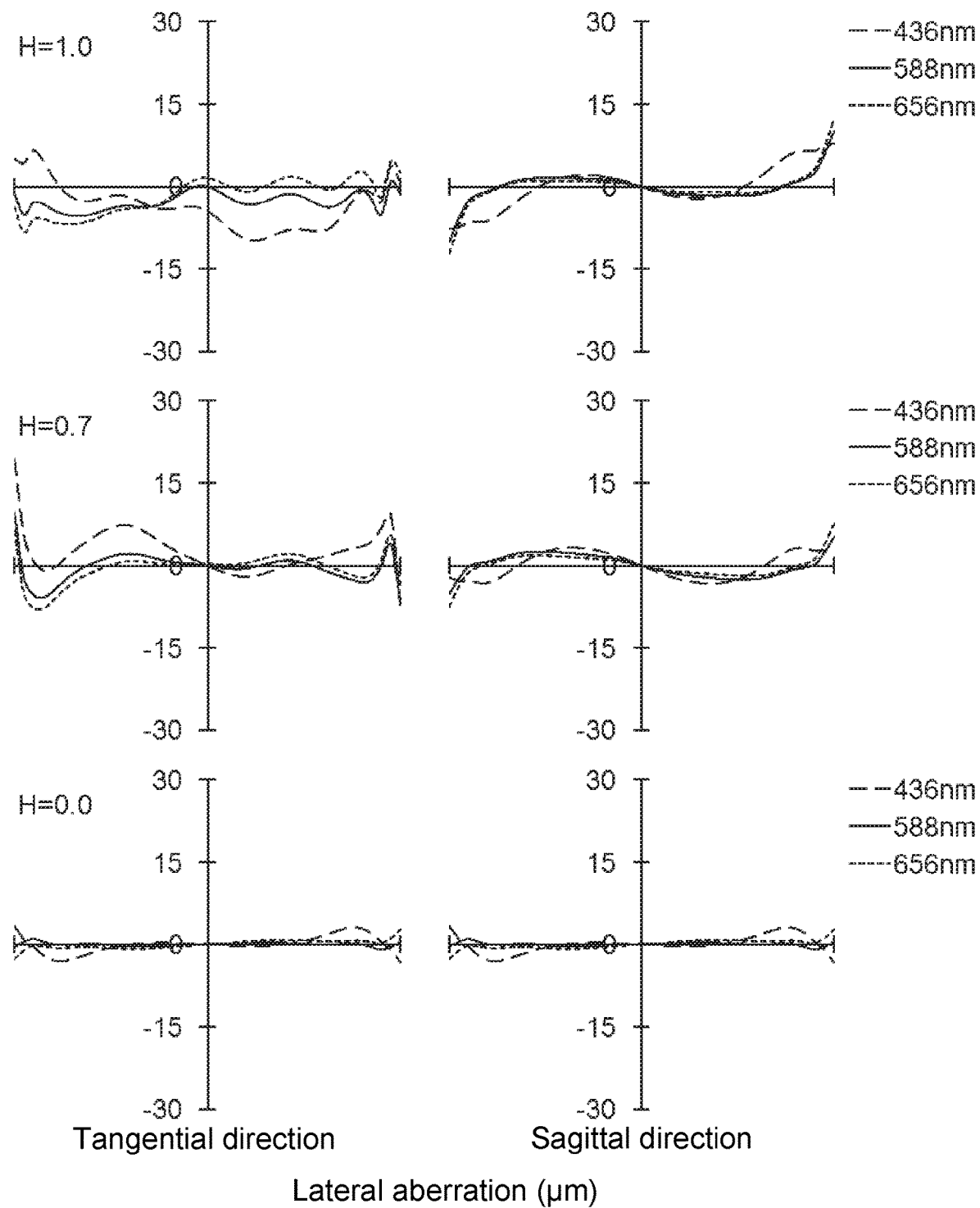
FIG. 11 is an aberration diagram showing a lateral aberration of the imaging lens of FIG. 10.
Figure 12:
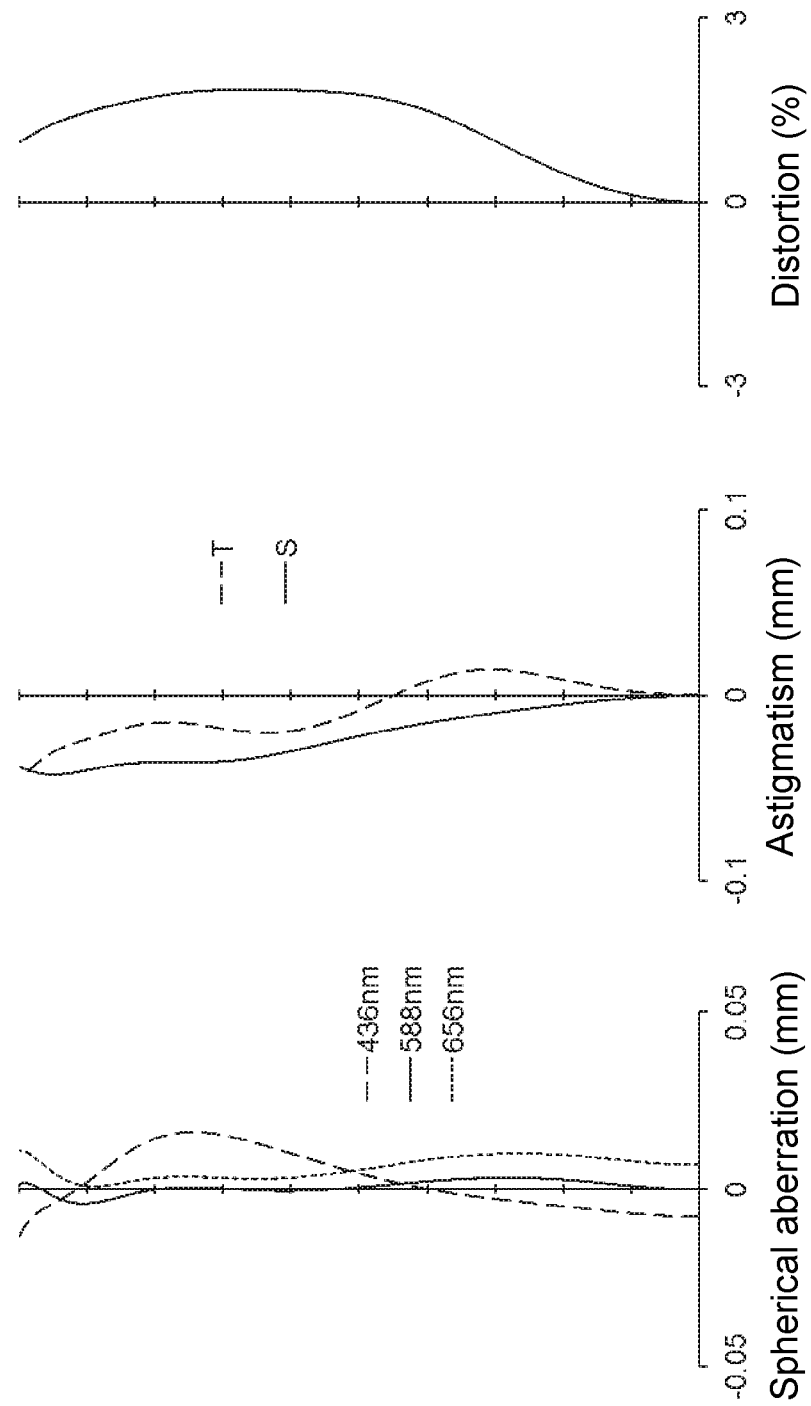
FIG. 12 is an aberration diagram showing a spherical aberration, astigmatism, and a distortion of the imaging lens of FIG. 10.
Figure 13:
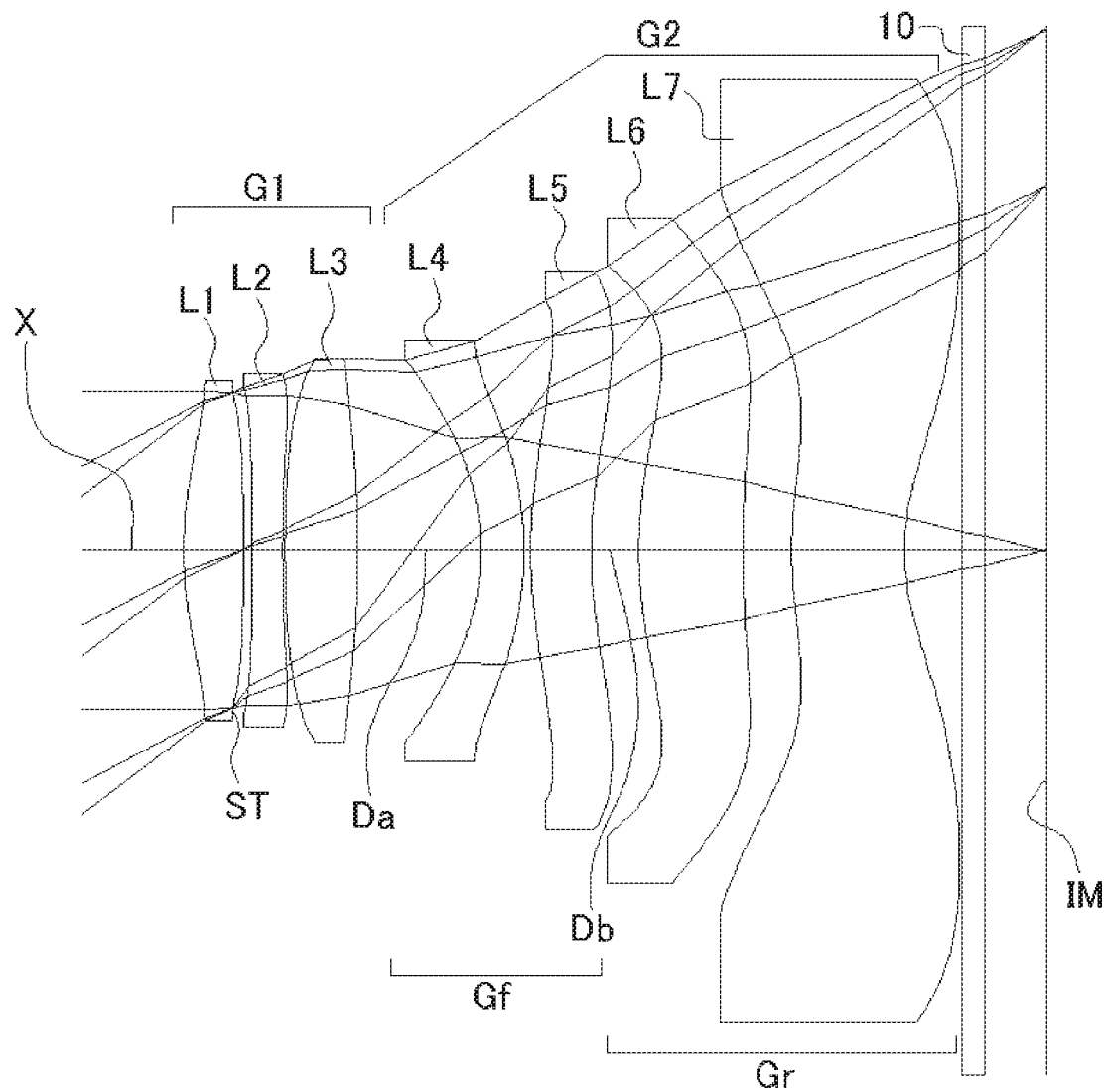
FIG. 13 shows a sectional view of a schematic configuration of an imaging lens in Numerical Data Example 5 according to the embodiment of the present invention.

FIG. 11 shows a lateral aberration that corresponds to the image height ratio H, and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5

Basic Lens Data

TABLE 9

| | | f = 6.00 mm Fno = 2.1 ω = 38.1° | | | | |
|---|---|---|---|---|---|---|
| | i | r | d | nd | vd | [mm] |
| | | ∞ | ∞ | | | |
| L1 | 1* | 3.722 | 0.535 | 1.5346 | 56.1 | f1 = 6.475 |
| | 2* (ST) | −46.957 | 0.079 | | | |
| L2 | 3* | −20.768 | 0.275 | 1.6355 | 23.9 | f2 = −20.445 |
| | 4* | 34.881 | 0.024 | | | |
| L3 | 5* | 14.193 | 0.648 | 1.5346 | 56.1 | f3 = 14.324 |
| | 6* | −16.365 | 1.110 (=Da) | | | |
| L4 | 7* | −2.414 | 0.390 | 1.6355 | 23.9 | f4 = −13.925 |
| | 8* | −3.528 | 0.063 | | | |
| L5 | 9* | 4.793 | 0.547 | 1.5346 | 56.1 | f5 = −269.532 |
| | 10* | 4.454 | 0.426 (=Db) | | | |
| L6 | 11* | 4.019 | 0.940 | 1.5346 | 56.1 | f6 = 11.100 |
| | 12* | 11.443 | 0.436 | | | |
| L7 | 13* | 3.724 | 1.018 | 1.5346 | 56.1 | f7 = −10.009 |
| | 14* | 1.987 | 0.520 | | | |
| | 15 | ∞ | 0.210 | 1.5168 | 64.2 | |
| | 16 | ∞ | 0.548 | | | |
| (IM) | | ∞ | | | | |

Hmax=4.71
La=7.697
F1=5.836
F2=−11.895
Ff=−12.683
Fr=54.582
Aspheric Surface Data

TABLE 10

| i | k | A4 | A6 | A8 | A10 | A12 | A14 | A16 |
|---|---|---|---|---|---|---|---|---|
| 1 | 0 | −1.359E−02 | −4.469E−03 | −2.041E−03 | 8.120E−04 | 7.378E−05 | −4.124E−05 | −2.307E−07 |
| 2 | 0 | 1.080E−02 | −4.660E−02 | 2.929E−02 | −8.414E−03 | 9.440E−04 | 2.773E−05 | −1.172E−05 |
| 3 | 0 | 4.918E−02 | −6.650E−02 | 3.681E−02 | −1.103E−02 | 1.621E−03 | −1.727E−04 | 1.995E−05 |
| 4 | 0 | 5.289E−02 | −4.723E−02 | 1.660E−02 | −3.536E−03 | 2.018E−04 | 9.148E−05 | −1.815E−05 |
| 5 | 0 | 2.289E−02 | −1.315E−02 | 6.875E−03 | −1.143E−03 | 9.490E−05 | −2.895E−05 | 4.463E−06 |
| 6 | 0 | −1.380E−02 | 1.696E−03 | 2.492E−03 | −8.062E−04 | 1.068E−04 | −2.532E−05 | 3.318E−06 |
| 7 | 0 | −1.762E−02 | 6.260E−03 | 3.340E−03 | −1.034E−03 | −5.898E−05 | 1.966E−05 | 2.645E−06 |
| 8 | 0 | −2.423E−02 | 9.781E−03 | −3.939E−04 | 3.744E−04 | −1.535E−04 | 8.418E−06 | 2.799E−06 |
| 9 | 0 | −1.671E−02 | 6.725E−04 | 7.323E−06 | 2.023E−06 | −7.353E−06 | 1.664E−06 | −2.502E−07 |
| 10 | 0 | −1.851E−02 | −3.809E−04 | 8.922E−05 | 8.701E−06 | 1.083E−06 | −5.314E−07 | −2.072E−09 |
| 11 | 0 | −1.331E−02 | −2.209E−03 | 1.086E−05 | −2.004E−05 | 8.310E−07 | 4.565E−07 | −2.316E−08 |
| 12 | 0 | 5.541E−05 | −4.116E−03 | 3.528E−04 | −5.490E−06 | −1.607E−07 | 7.459E−10 | 1.183E−09 |
| 13 | 0 | −6.201E−02 | 5.794E−03 | −1.649E−04 | −2.483E−06 | −1.099E−07 | −4.418E−09 | 9.328E−10 |
| 14 | −3.861 | −2.471E−02 | 3.206E−03 | −2.100E−04 | 4.851E−06 | 1.736E−07 | −1.323E−08 | 2.359E−10 |

The values of the respective conditional expressions are as follows:

$La/f = 1.28$ $La/Hmax = 1.63$ $Da/f = 0.19$ $R4f/f = -0.40$ $R4r/f = -0.59$ $R7r/f = 0.33$ $F1/f = 0.97$ $f2/F1 = -3.50$ $Ff/Fr = -0.23$ $Db/f = 0.07$ $Fr/f = 9.10$ $f4/f = -2.32$ $|f5|/f = 44.92$ $f4/f6 = -1.25$ $f6/F2 = -0.93$ Accordingly, the imaging lens of Numerical Data Example 5 satisfies the above-described conditional expressions.

Figure 14:
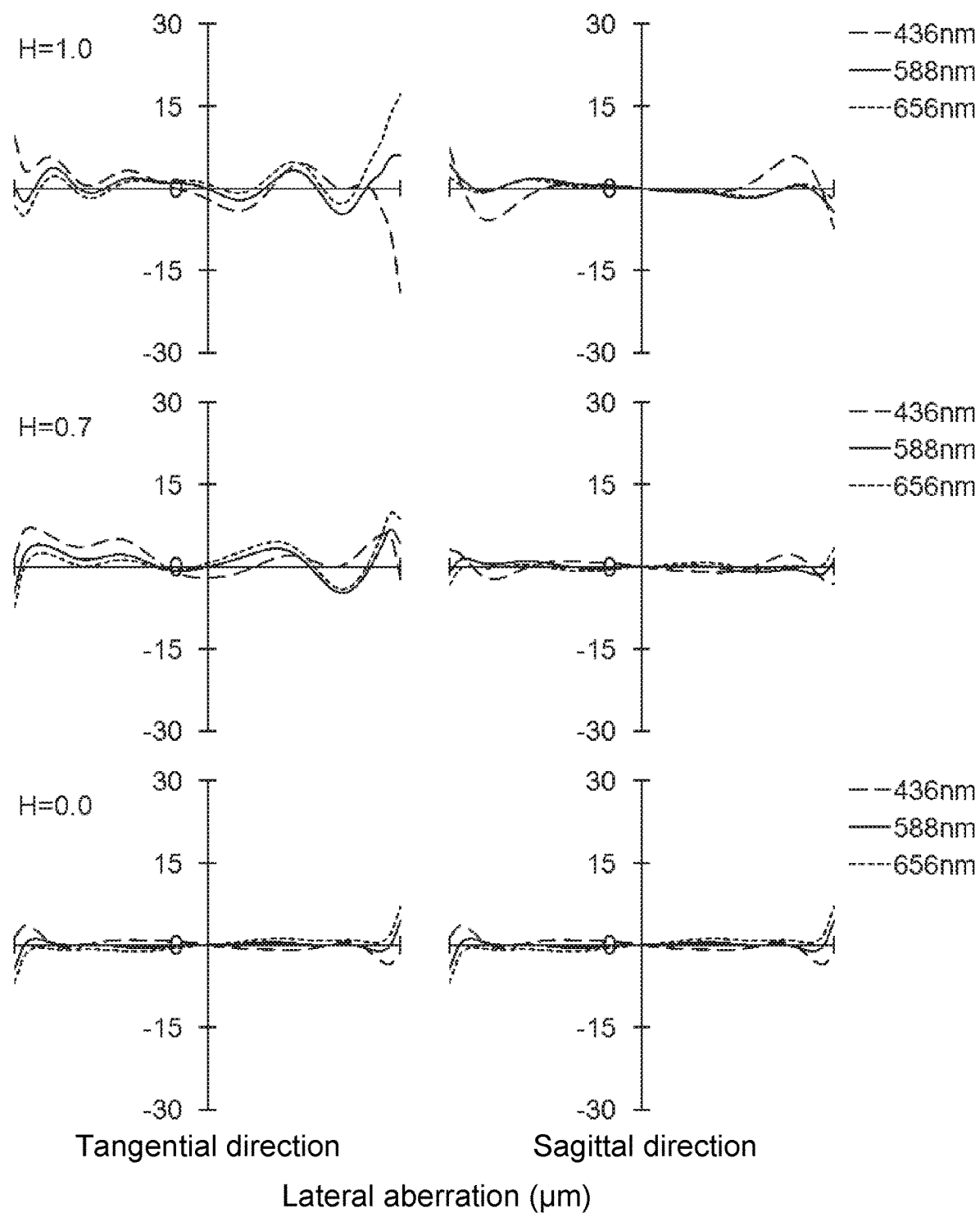
FIG. 14 is an aberration diagram showing a lateral aberration of the imaging lens of FIG. 13.
Figure 15:
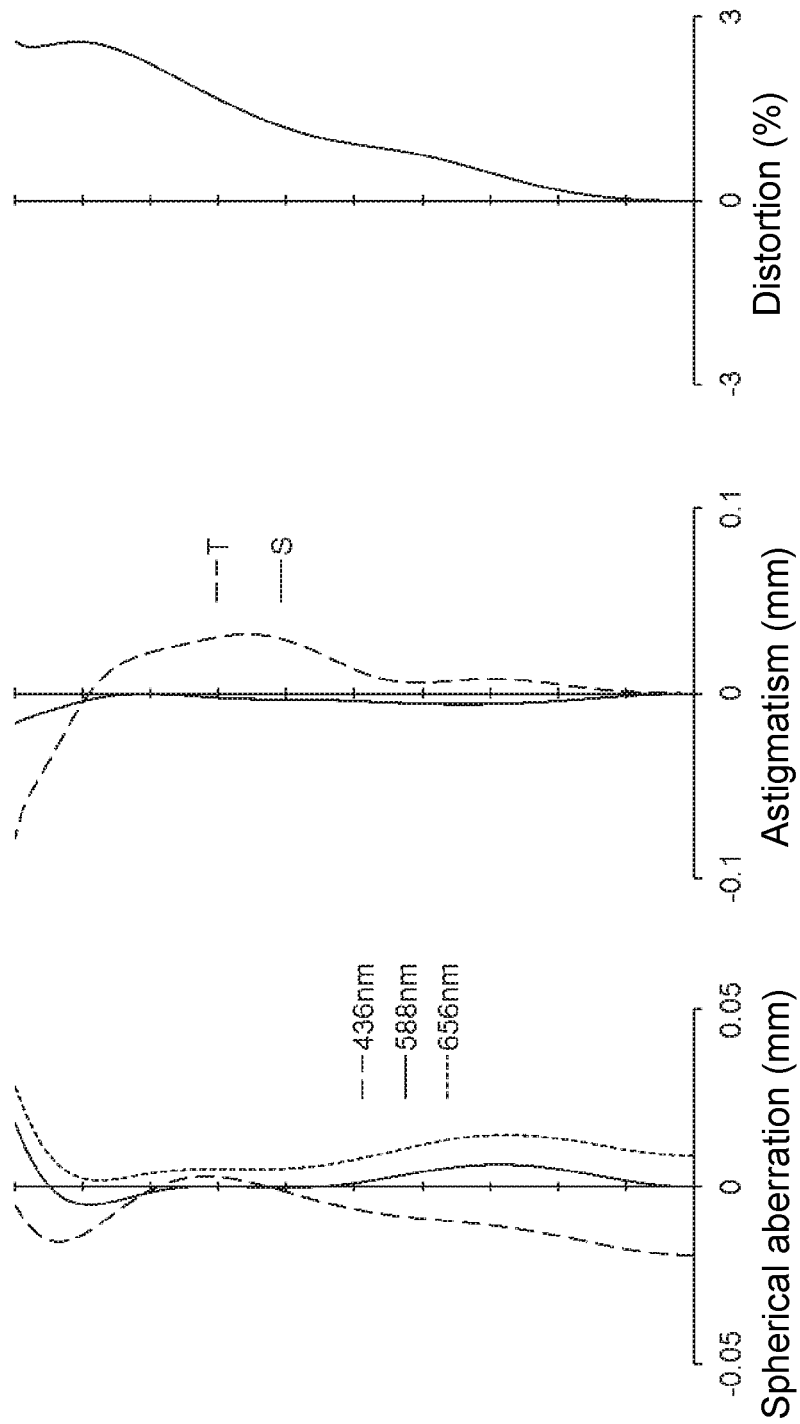
FIG. 15 is an aberration diagram showing a spherical aberration, astigmatism, and a distortion of the imaging lens of FIG. 13.

FIG. 14 shows a lateral aberration that corresponds to the image height ratio H, and FIG. 15 shows a spherical aberration (mm), astigmatism (mm), and a distortion (%), respectively. As shown in FIGS. 14 and 15, according to the imaging lens of Numerical Data Example 5, the aberrations are also satisfactorily corrected.

According to the imaging lens of the embodiment described above, it is achievable to have a wide angle of view (2ω) of 70° or greater. According to Numerical Data Examples 1 to 5, the imaging lenses have wide angles of view of 73.0° to 78.2°. According to the imaging lens of the embodiment, it is possible to take an image over a wider range than that taken by a conventional imaging lens.

Moreover, in these years, with advancement in digital zoom technology, which enables to enlarge any area of an image obtained through an imaging lens by image processing, an imaging element having a high pixel count is often used in combination with a high-resolution imaging lens. In case of such an imaging element with a high pixel count, a light-receiving area of each pixel decreases, so that an image tends to be dark. According to the imaging lenses of Numerical Data Examples 1 to 5, the Fnos are as small as 2.1 to 2.2. According to the imaging lens of the embodiment, it is possible to obtain a sufficiently bright image applicable to a high pixel count imaging element.

Accordingly, when the imaging lens of the embodiment is mounted in an imaging optical system, such as cameras built in portable devices including cellular phones, portable information terminals, and smartphones, digital still cameras, security cameras, onboard cameras, and network cameras, it is possible to attain both high performance and downsizing of the cameras.

The present invention is applicable to an imaging lens to be mounted in relatively small cameras, such as cameras to be built in portable devices including cellular phones, smartphones, and portable information terminals, digital still cameras, security cameras, onboard cameras, and network cameras.

The disclosure of Japanese Patent Application No. 2015-171027, filed on Aug. 31, 2015, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens group; and
a second lens group, arranged in this order from an object side to an image plane side,
wherein said first lens group includes a first lens, a second lens, and a third lens, arranged in this order from the object side to the image plane side,
said second lens group includes a front side lens group and a rear side lens group, arranged in this order from the object side to the image plane side,
said front side lens group includes a fourth lens and a fifth lens,
said rear side lens group includes a sixth lens having two aspheric surfaces and a seventh lens having two aspheric surfaces,
said imaging lens has a total of seven single lenses,
said first lens, said second lens, said third lens, said fourth lens, said fifth lens, said sixth lens, and said seventh lens are arranged respectively with a space in between,
said third lens is formed in a shape so that a surface thereof on the object side and a surface thereof on the image plane side are convex near an optical axis thereof,
said fourth lens is formed in a shape so that a surface thereof on the object side is concave near an optical axis thereof,
said fifth lens is formed in a shape so that a surface thereof on the image plane side is concave near an optical axis thereof, and
said rear side lens group has a focal length Fr so that the following conditional expression is satisfied:

$1 < Fr/f < 10$, where f is a focal length of a whole lens system.

2. The imaging lens according to claim 1, wherein said fourth lens is formed in the shape so that a surface thereof on the image plane side has a curvature radius R4r so that the following conditional expression is satisfied:

$-1.2 < R4r/f < -0.3$.

3. The imaging lens according to claim 1, wherein said seventh lens is formed in a shape so that a surface thereof on the image plane side has a curvature radius R7r so that the following conditional expression is satisfied:

$0.2 < R7r/f < 0.6$.

4. The imaging lens according to claim 1, wherein said front side lens group has a focal length Ff so that the following conditional expression is satisfied:

$-1.5 < Ff/Fr < -0.1$.

5. The imaging lens according to claim 1, wherein said fifth lens has a focal length f5 so that the following conditional expression is satisfied:

$3 < |f5|/f < 60$.

6. An imaging lens comprising:
a first lens group; and
a second lens group, arranged in this order from an object side to an image plane side,
wherein said first lens group includes a first lens, a second lens, and a third lens, arranged in this order from the object side to the image plane side,
said second lens group includes a front side lens group and a rear side lens group, arranged in this order from the object side to the image plane side,
said front side lens group includes a fourth lens having negative refractive power and a fifth lens,
said rear side lens group includes a sixth lens having two aspheric surfaces and a seventh lens having two aspheric surfaces,
said imaging lens has a total of seven single lenses,
said first lens, said second lens, said third lens, said fourth lens, said fifth lens, said sixth lens, and said seventh lens are arranged respectively with a space in between,
said third lens is formed in a shape so that a surface thereof on the object side and a surface thereof on the image plane side are convex near an optical axis thereof,
said fourth lens is formed in a shape so that a surface thereof on the object side is concave near an optical axis thereof,
said fifth lens has at least one aspheric surface, and
said fifth lens is formed in a shape so that a surface thereof on the image plane side is concave near an optical axis thereof.

7. The imaging lens according to claim 6, wherein said fourth lens is formed in the shape so that a surface thereof on the image plane side has a curvature radius R4r so that the following conditional expression is satisfied:

$-1.2<R4r/f<-0.3$, where f is a focal length of a whole lens system.

8. The imaging lens according to claim 6, wherein said seventh lens is formed in a shape so that a surface thereof on the image plane side has a curvature radius R7r so that the following conditional expression is satisfied:

$0.2<R7r/f<0.6$, where f is a focal length of a whole lens system.

9. The imaging lens according to claim 6, wherein said front side lens group has a focal length Ff and said rear side lens group has a focal length Fr so that the following conditional expression is satisfied:

$-1.5<Ff/Fr<-0.1$.

10. The imaging lens according to claim 6, wherein said fifth lens has a focal length f5 so that the following conditional expression is satisfied:

$3<|f5|/f<60$, where f is a focal length of a whole lens system.

11. An imaging lens comprising:
a first lens group; and
a second lens group, arranged in this order from an object side to an image plane side,
wherein said first lens group includes a first lens, a second lens, and a third lens, arranged in this order from the object side to the image plane side,
said second lens group includes a front side lens group and a rear side lens group, arranged in this order from the object side to the image plane side,
said front side lens group includes a fourth lens and a fifth lens,
said rear side lens group includes a sixth lens having two aspheric surfaces and a seventh lens having two aspheric surfaces,
said imaging lens has a total of seven single lenses,
said first lens, said second lens, said third lens, said fourth lens, said fifth lens, said sixth lens, and said seventh lens are arranged respectively with a space in between,
said third lens is formed in a shape so that a surface thereof on the object side and a surface thereof on the image plane side are convex near an optical axis thereof,
said fourth lens is formed in a shape so that a surface thereof on the object side is concave near an optical axis thereof,
said fifth lens is formed in a shape so that a surface thereof on the image plane side is concave near an optical axis thereof, and
said front side lens group has a focal length Ff and said rear side lens group has a focal length Fr so that the following conditional expression is satisfied:

$-1.5<Ff/Fr<-0.1$.

12. The imaging lens according to claim 11, wherein said fourth lens is formed in the shape so that a surface thereof on the image plane side has a curvature radius R4r so that the following conditional expression is satisfied:

$-1.2<R4r/f<-0.3$, where f is a focal length of a whole lens system.

13. The imaging lens according to claim 11, wherein said seventh lens is formed in a shape so that a surface thereof on the image plane side has a curvature radius R7r so that the following conditional expression is satisfied:

$0.2<R7r/f<0.6$, where f is a focal length of a whole lens system.

14. The imaging lens according to claim 11, wherein said rear side lens group has the focal length Fr so that the following conditional expression is satisfied:

$1<Fr/f<10$, where f is a focal length of a whole lens system.

15. The imaging lens according to claim 11, wherein said fifth lens has a focal length f5 so that the following conditional expression is satisfied:

$3<|f5|/f<60$, where f is a focal length of a whole lens system.

16. An imaging lens comprising:
a first lens group; and
a second lens group, arranged in this order from an object side to an image plane side,
wherein said first lens group includes a first lens, a second lens, and a third lens, arranged in this order from the object side to the image plane side,
said second lens group includes a front side lens group and a rear side lens group, arranged in this order from the object side to the image plane side,
said front side lens group includes a fourth lens and a fifth lens,
said rear side lens group includes a sixth lens having two aspheric surfaces and a seventh lens having two aspheric surfaces,
said imaging lens has a total of seven single lenses, said first lens, said second lens, said third lens, said fourth lens, said fifth lens, said sixth lens, and said seventh lens are arranged respectively with a space in between, said third lens is formed in a shape so that a surface thereof on the object side and a surface thereof on the image plane side are convex near an optical axis thereof, said fourth lens is formed in a shape so that a surface thereof on the object side is concave near an optical axis thereof, said fifth lens is formed in a shape so that a surface thereof on the image plane side is concave near an optical axis thereof, and said fifth lens has a focal length f5 so that the following conditional expression is satisfied:

$$3<|f5|/f<60,$$

where f is a focal length of a whole lens system.

17. The imaging lens according to claim 16, wherein said fourth lens is formed in the shape so that a surface thereof on the image plane side has a curvature radius R4r so that the following conditional expression is satisfied:

$$-1.2<R4r/f<-0.3.$$

18. The imaging lens according to claim 16, wherein said seventh lens is formed in a shape so that a surface thereof on the image plane side has a curvature radius R7r so that the following conditional expression is satisfied:

$$0.2<R7r/f<0.6.$$

19. The imaging lens according to claim 16, wherein said rear side lens group has a focal length Fr so that the following conditional expression is satisfied:

$$1<Fr/f<10.$$

20. The imaging lens according to claim 16, wherein said front side lens group has a focal length Ff and said rear side lens group has a focal length Fr so that the following conditional expression is satisfied:

$$-1.5<Ff/Fr<-0.1.$$

* * * * *